March 7, 1933.　　　H. A. W. WOOD　　　1,900,265
MACHINE FOR CASTING STEREOTYPE PRINTING PLATES
Original Filed Aug. 27, 1929　　21 Sheets-Sheet 1

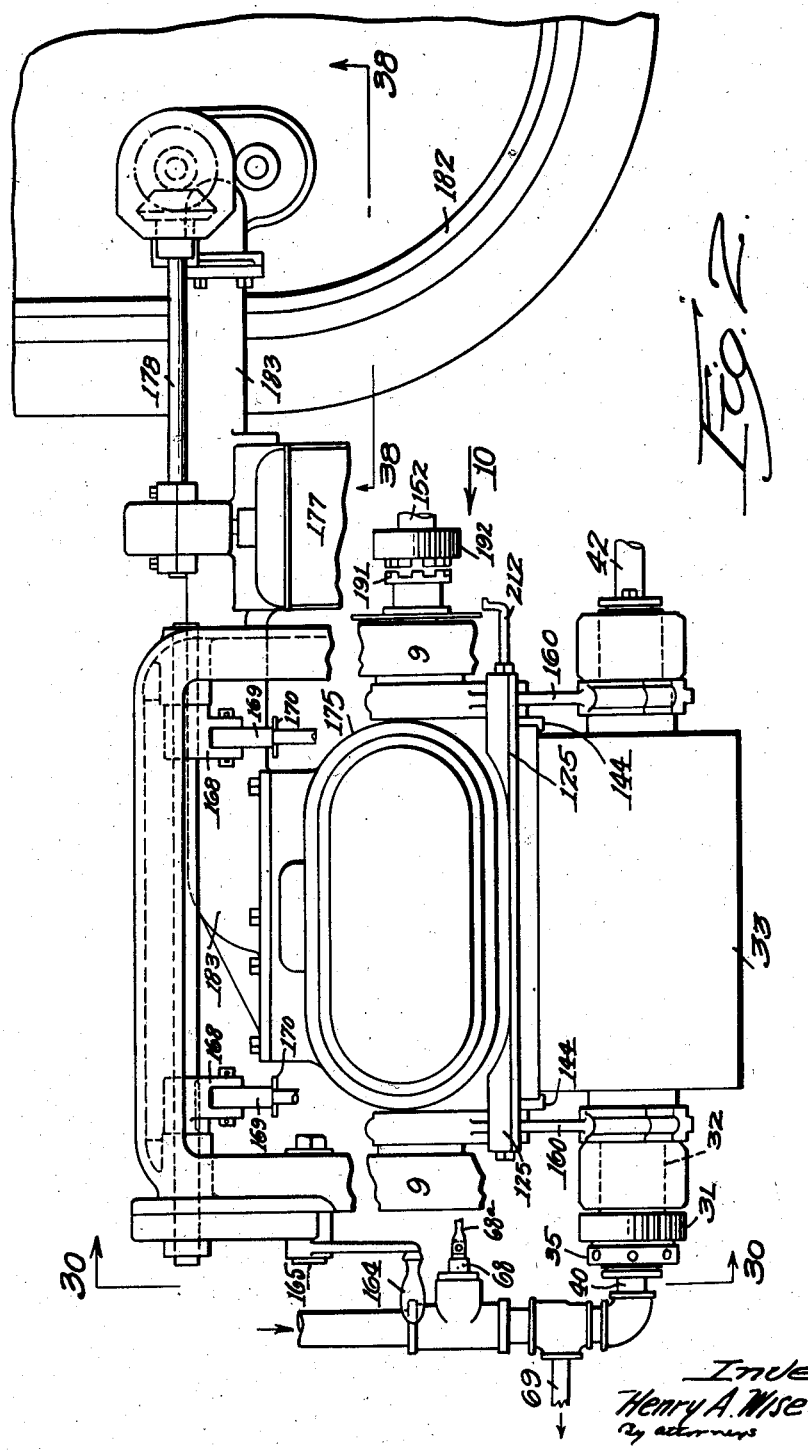

March 7, 1933.    H. A. W. WOOD    1,900,265
MACHINE FOR CASTING STEREOTYPE PRINTING PLATES
Original Filed Aug. 27, 1929    21 Sheets-Sheet 3
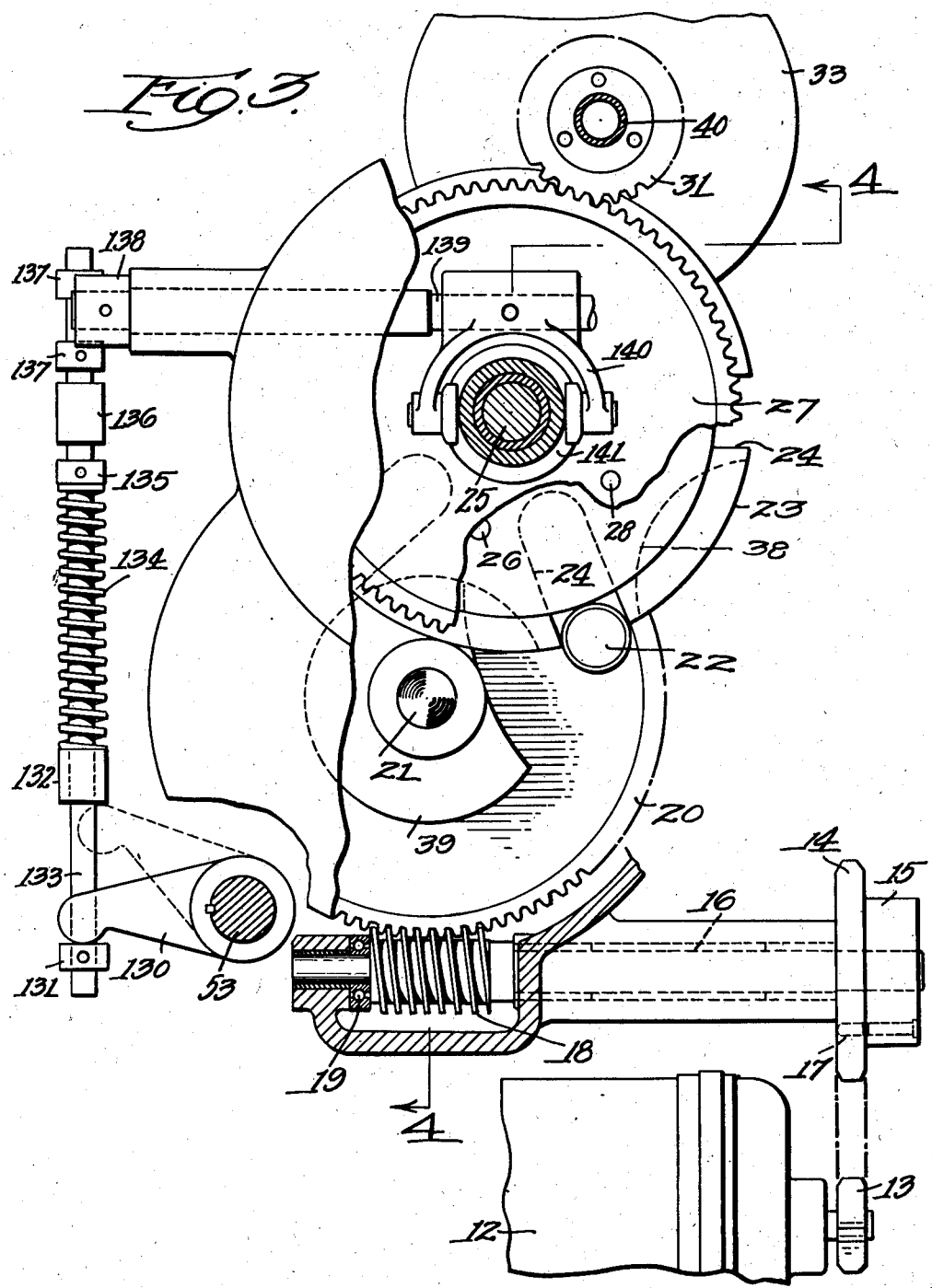

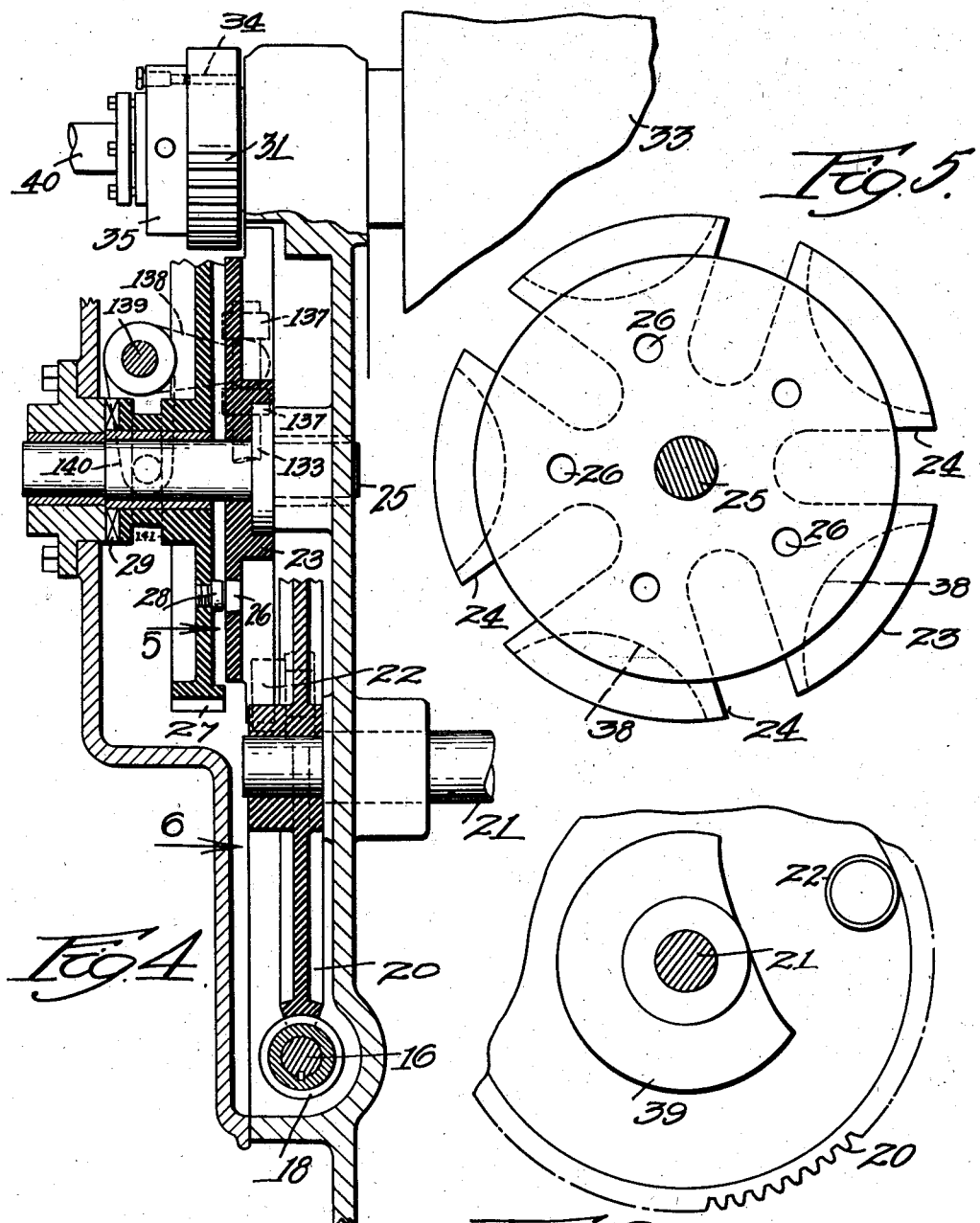

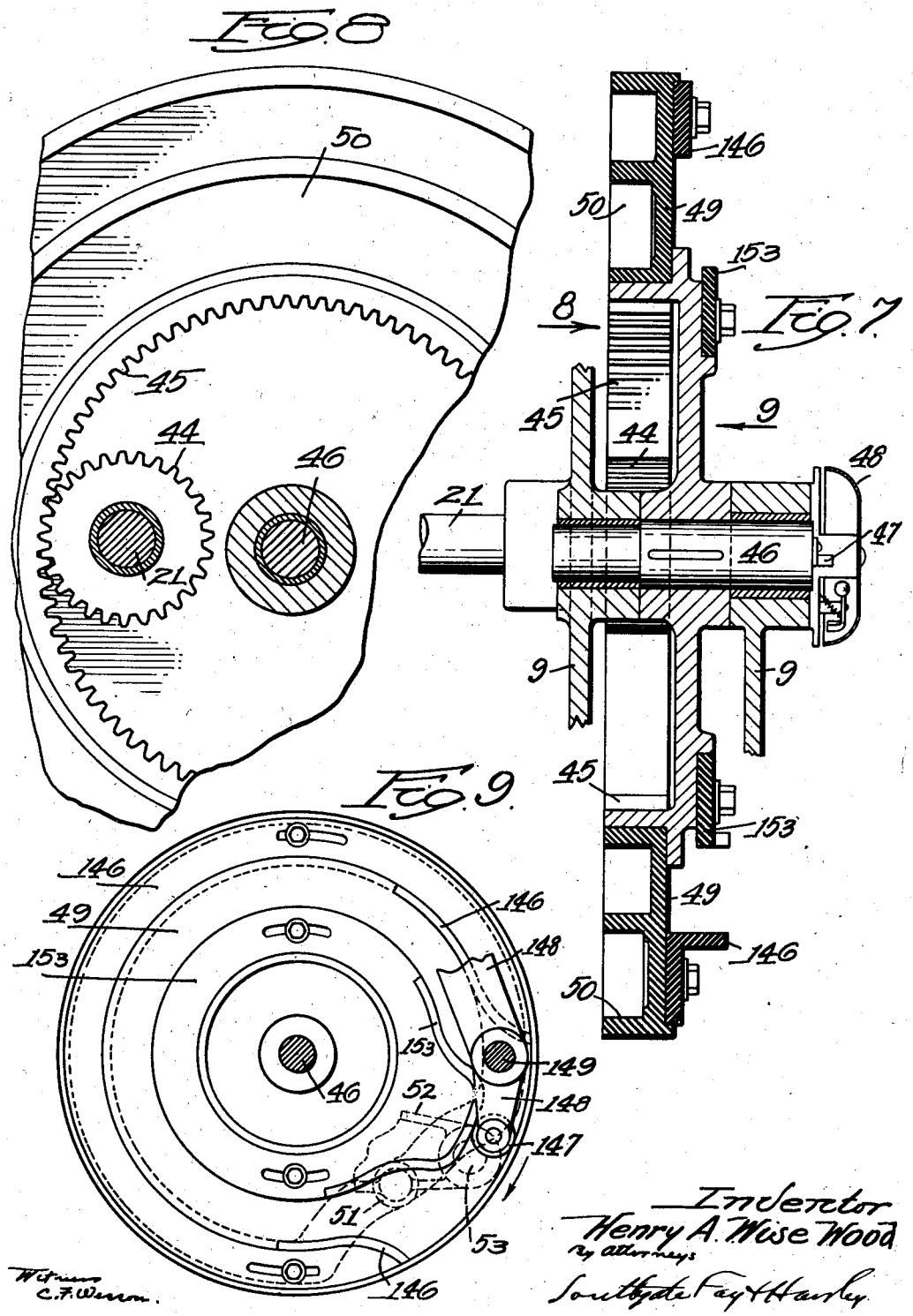

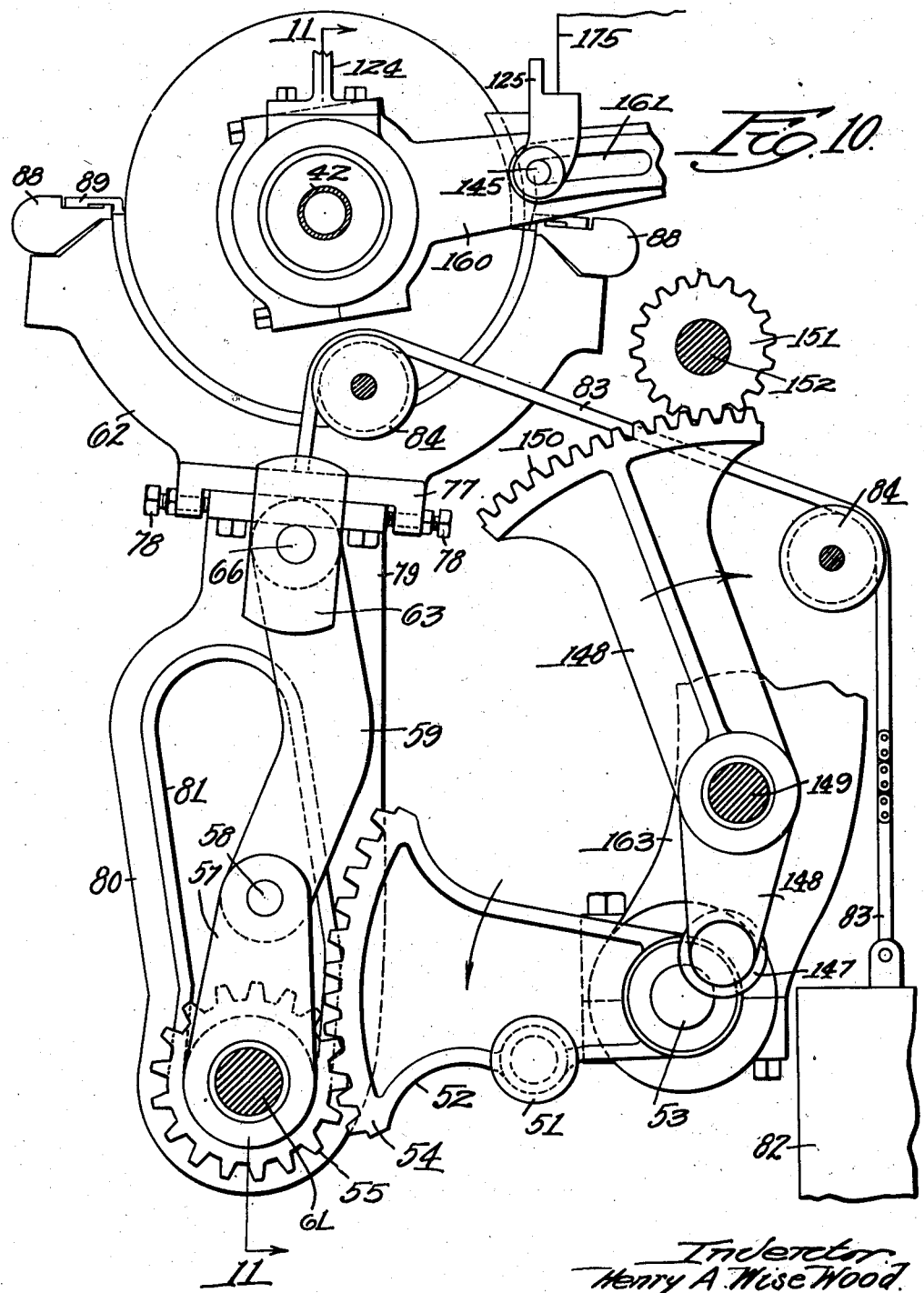

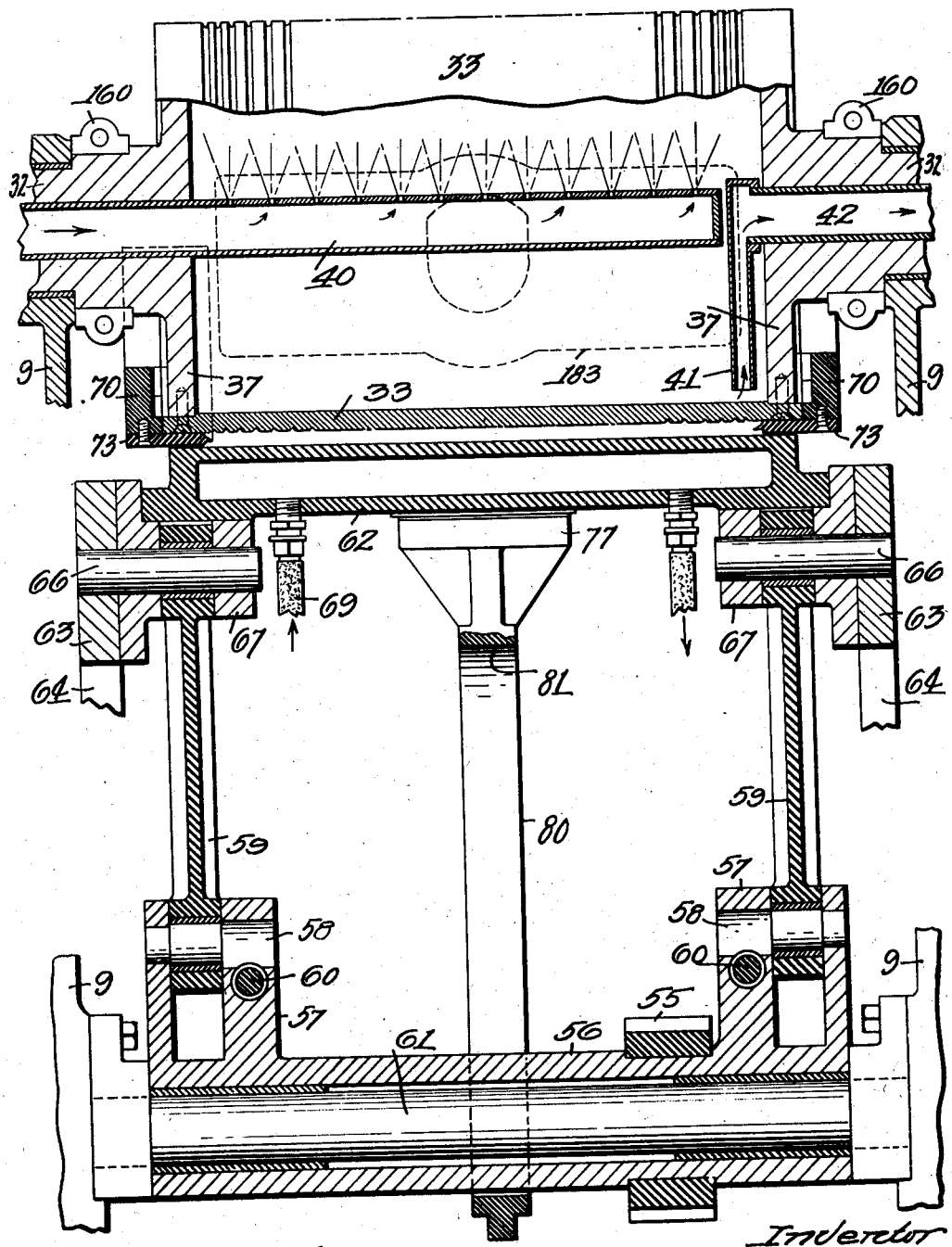

March 7, 1933. H. A. W. WOOD 1,900,265
MACHINE FOR CASTING STEREOTYPE PRINTING PLATES
Original Filed Aug. 27, 1929 21 Sheets-Sheet 8
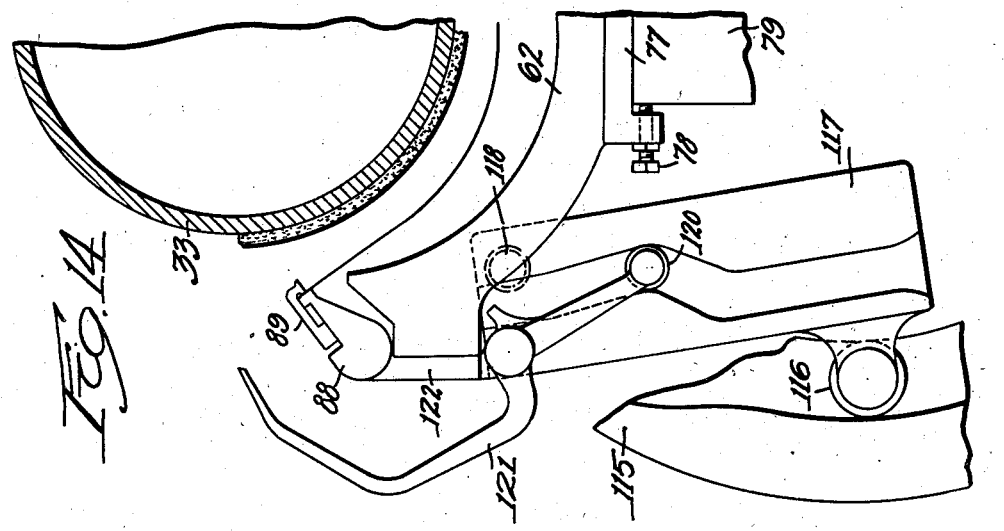
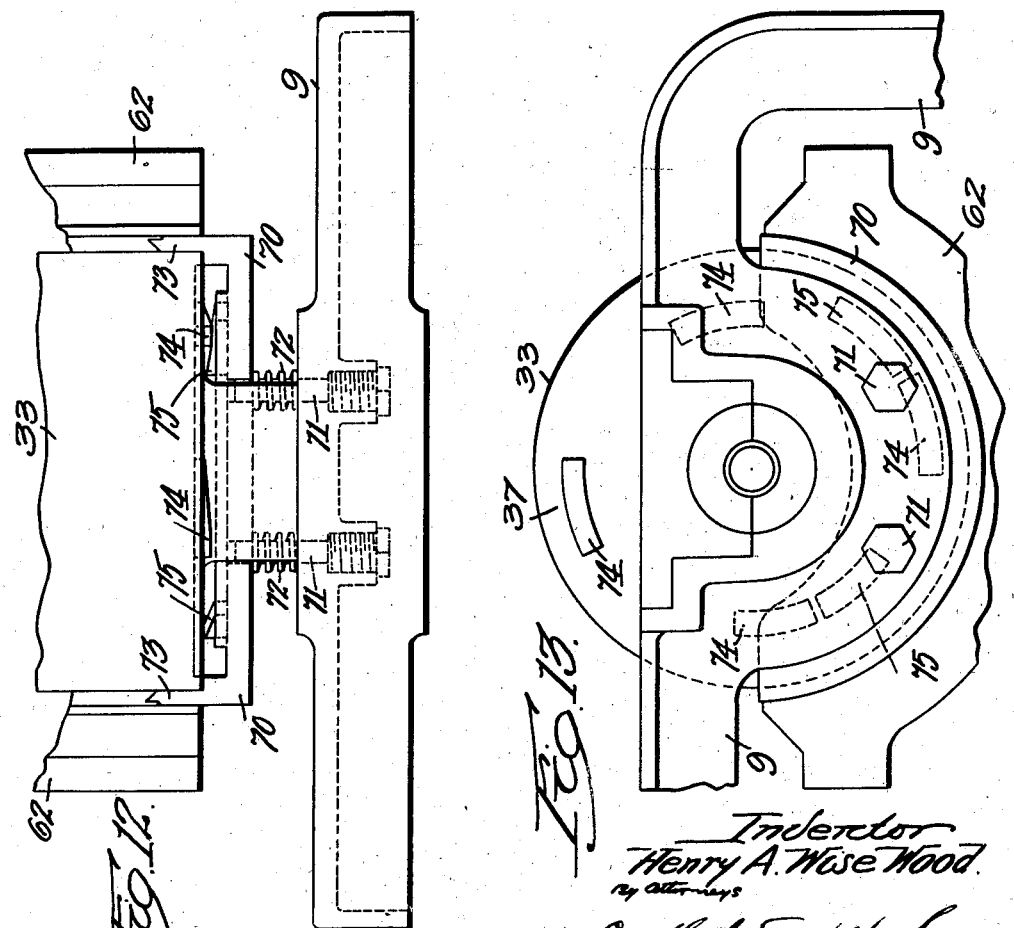

March 7, 1933. H. A. W. WOOD 1,900,265
MACHINE FOR CASTING STEREOTYPE PRINTING PLATES
Original Filed Aug. 27, 1929 21 Sheets-Sheet 9
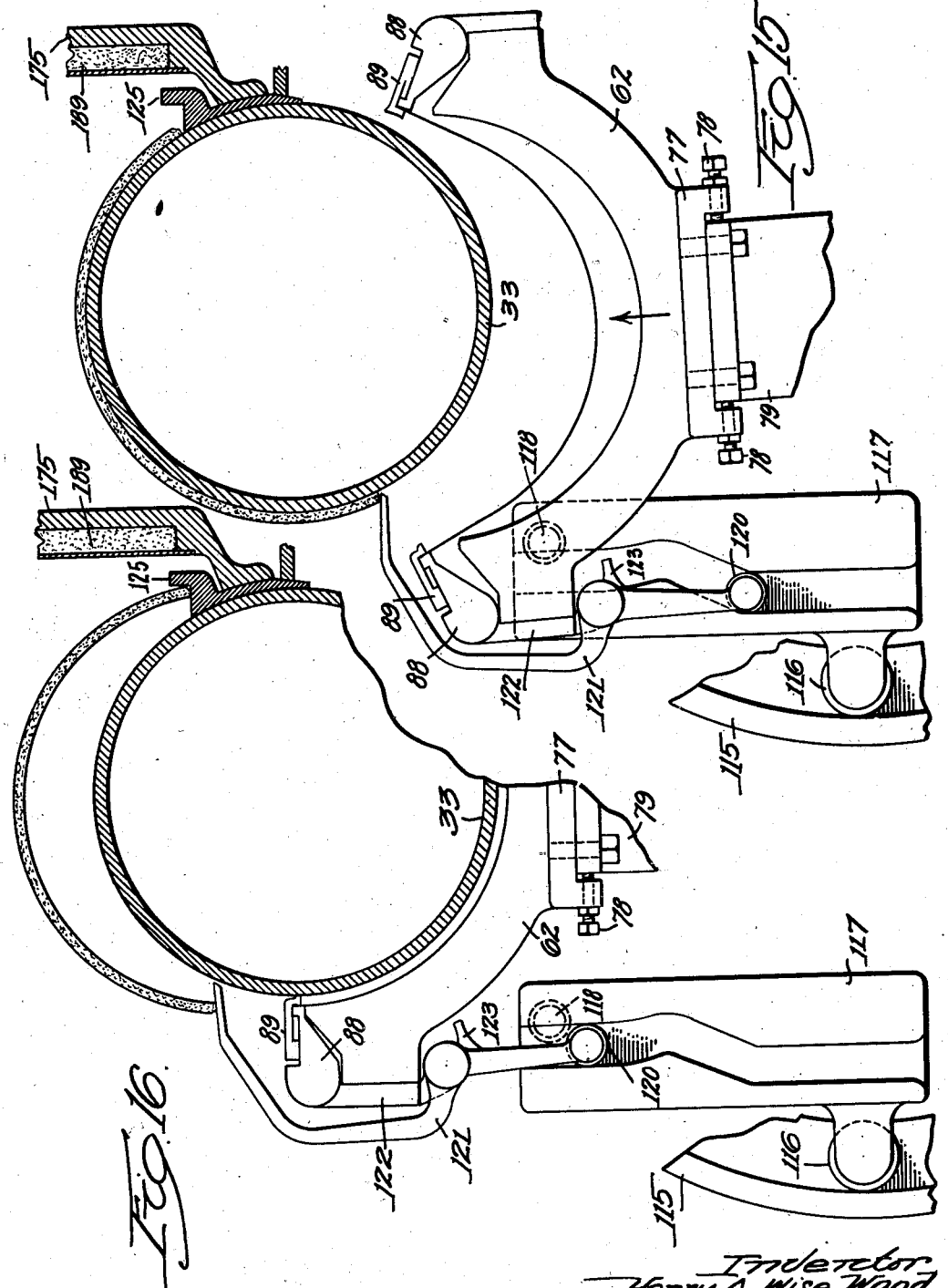

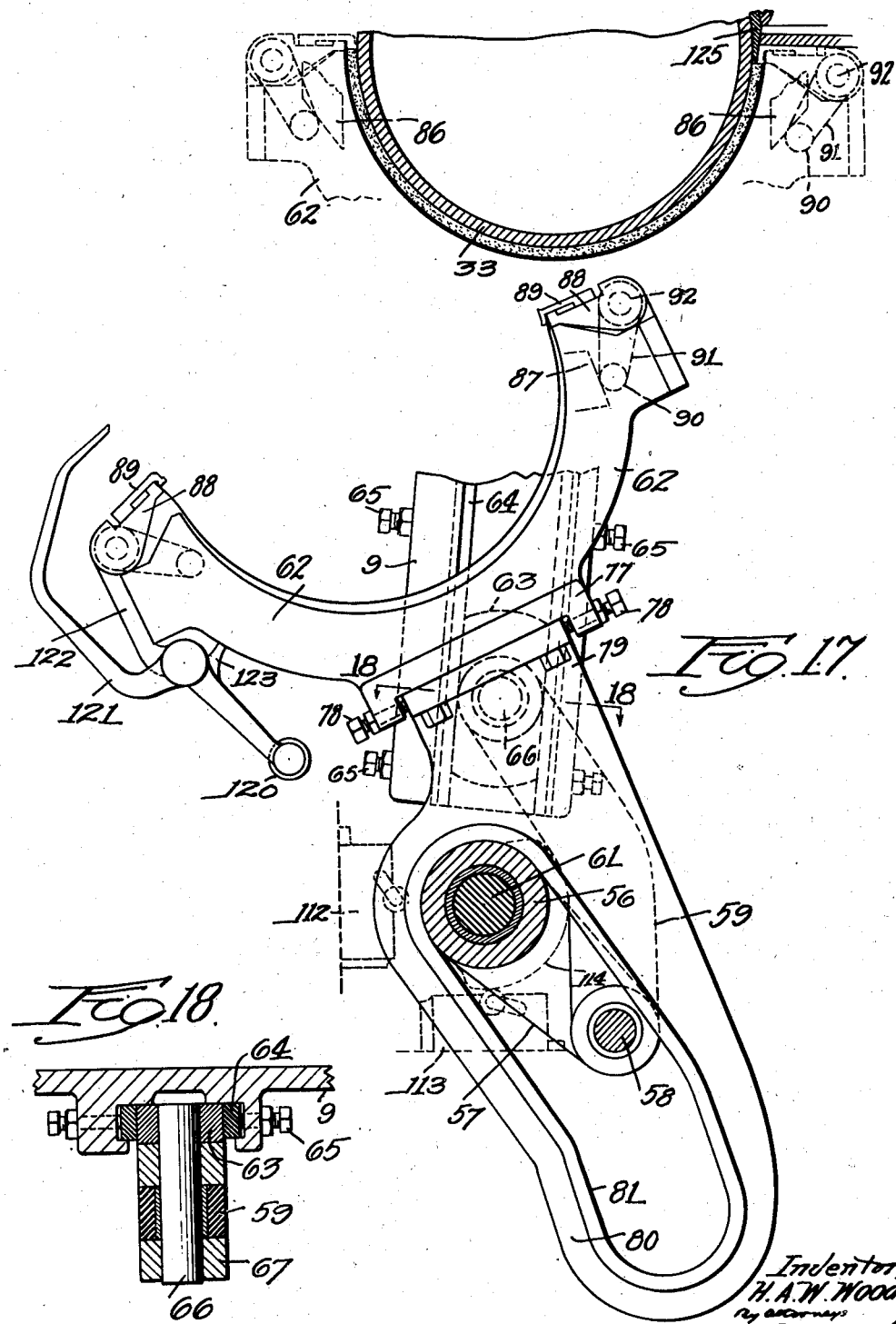

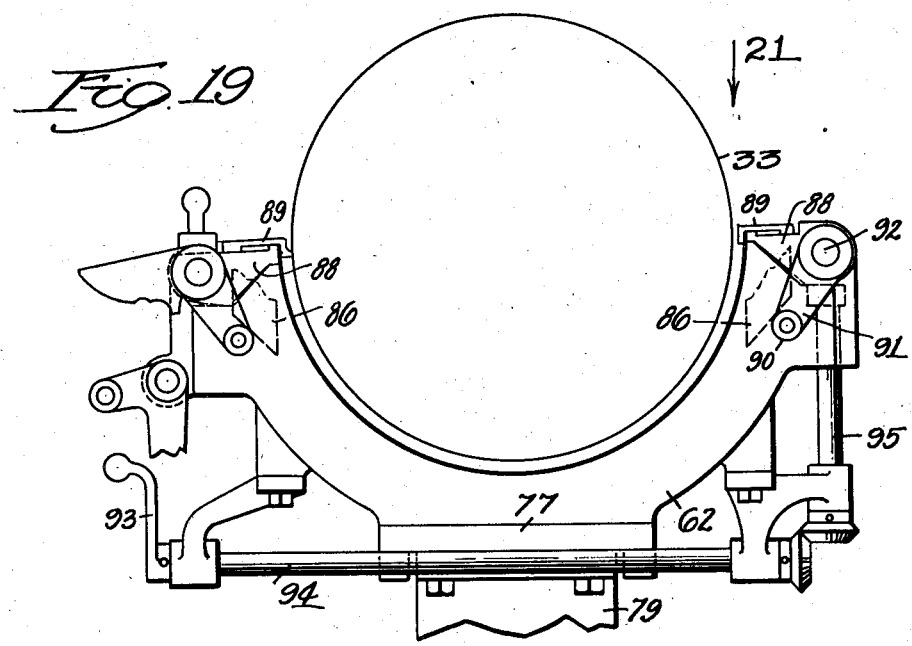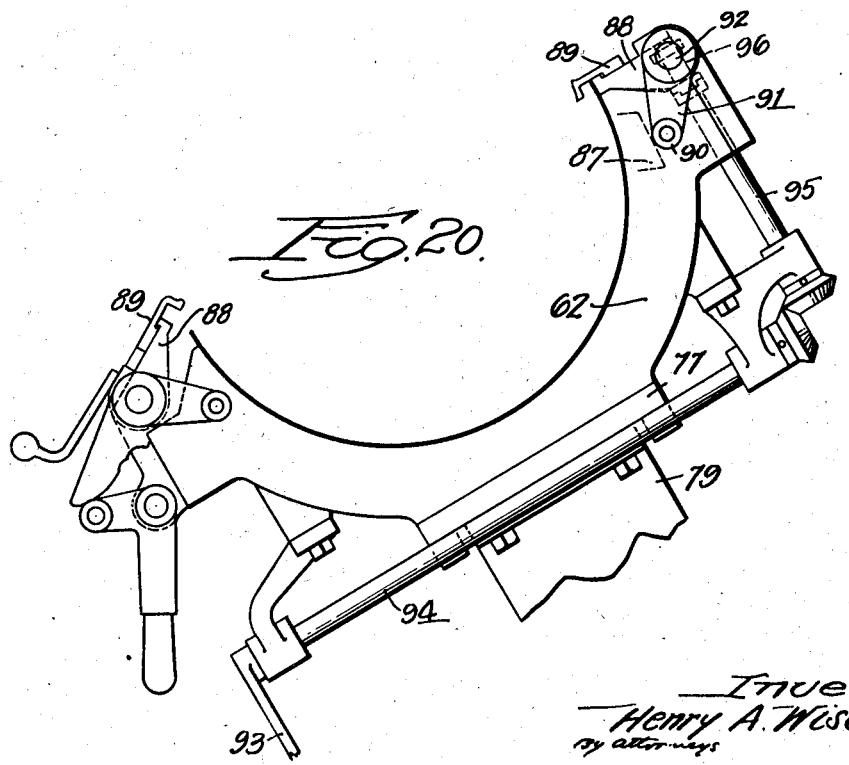

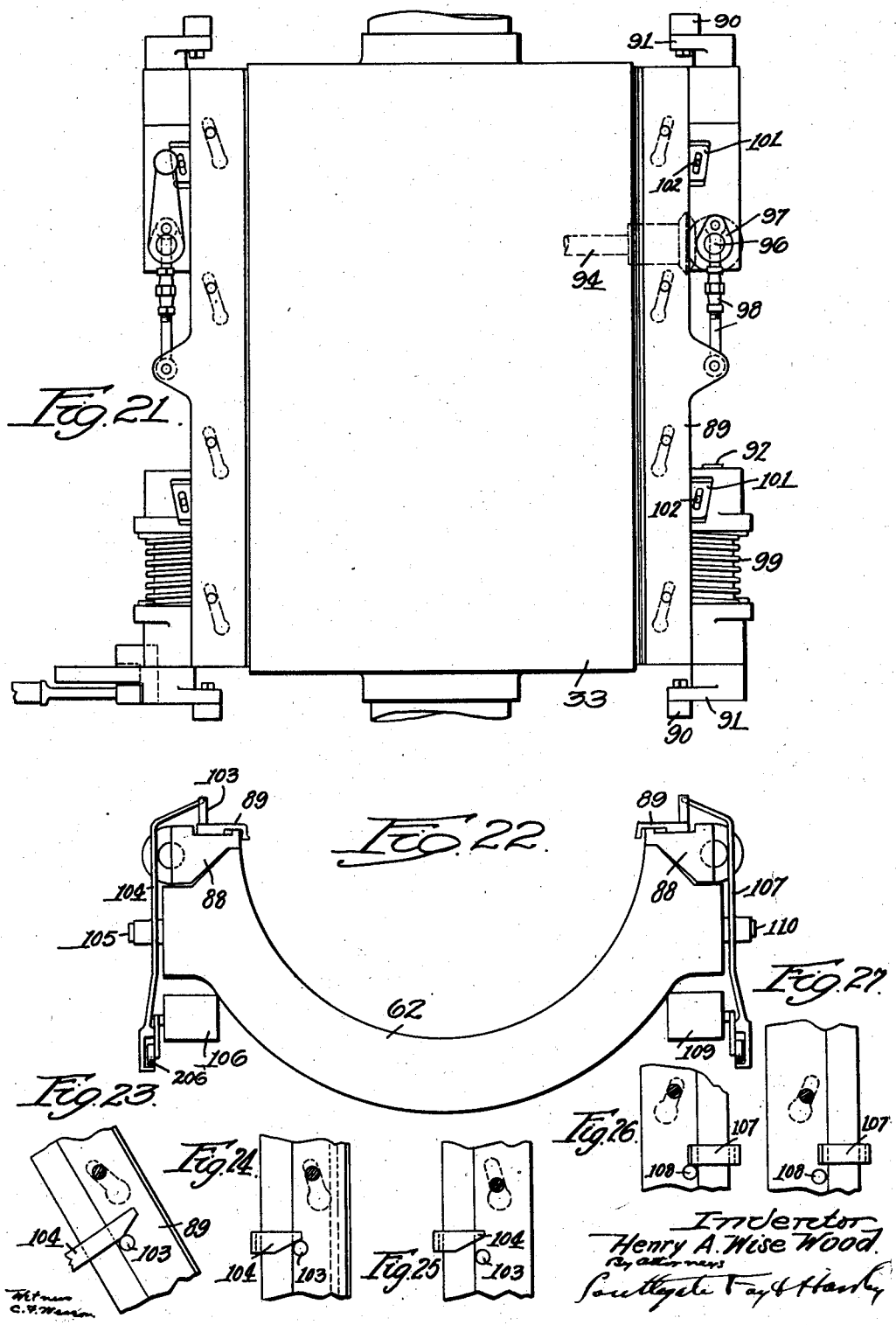

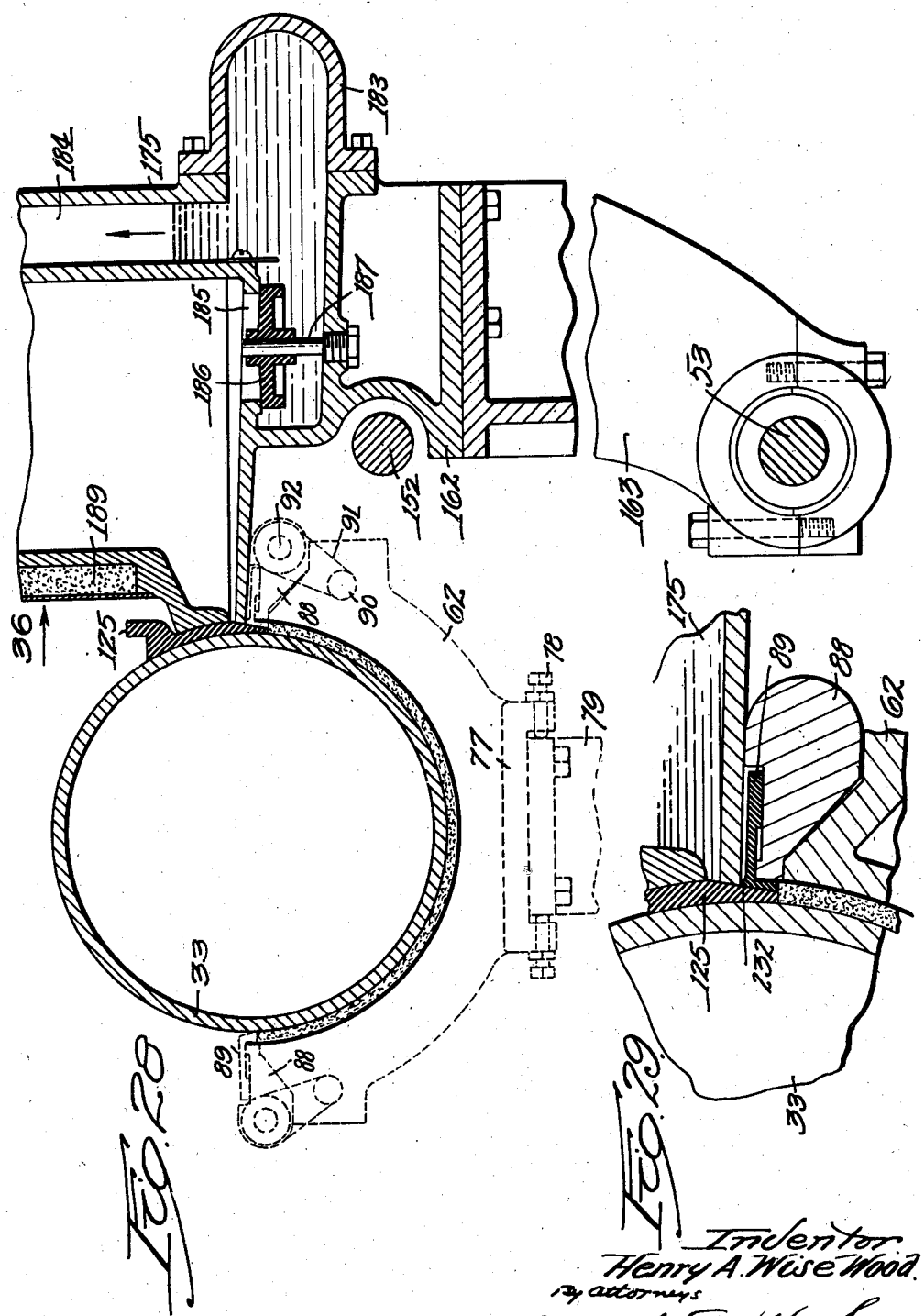

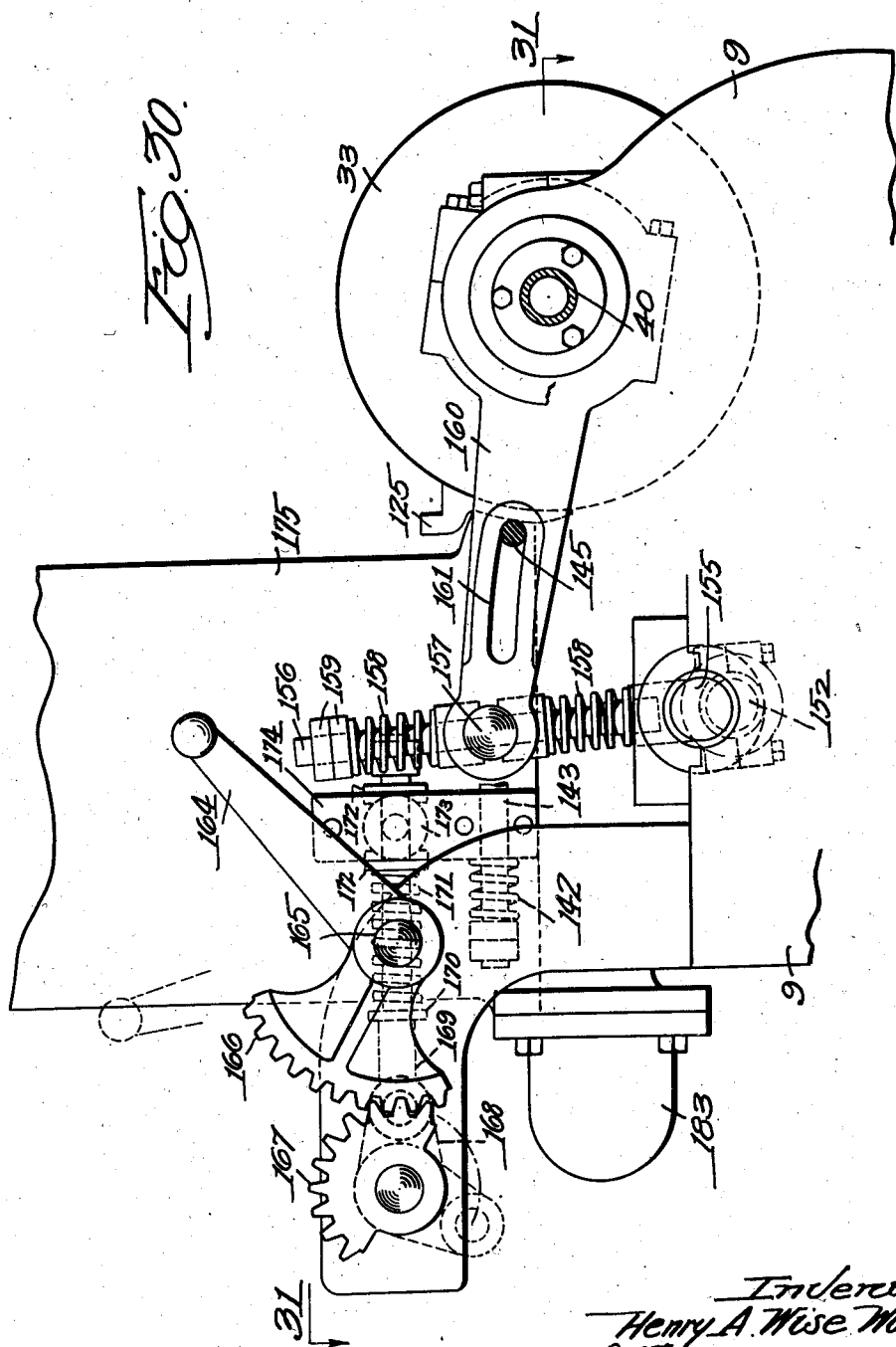

March 7, 1933. H. A. W. WOOD 1,900,265
MACHINE FOR CASTING STEREOTYPE PRINTING PLATES
Original Filed Aug. 27, 1929 21 Sheets-Sheet 15
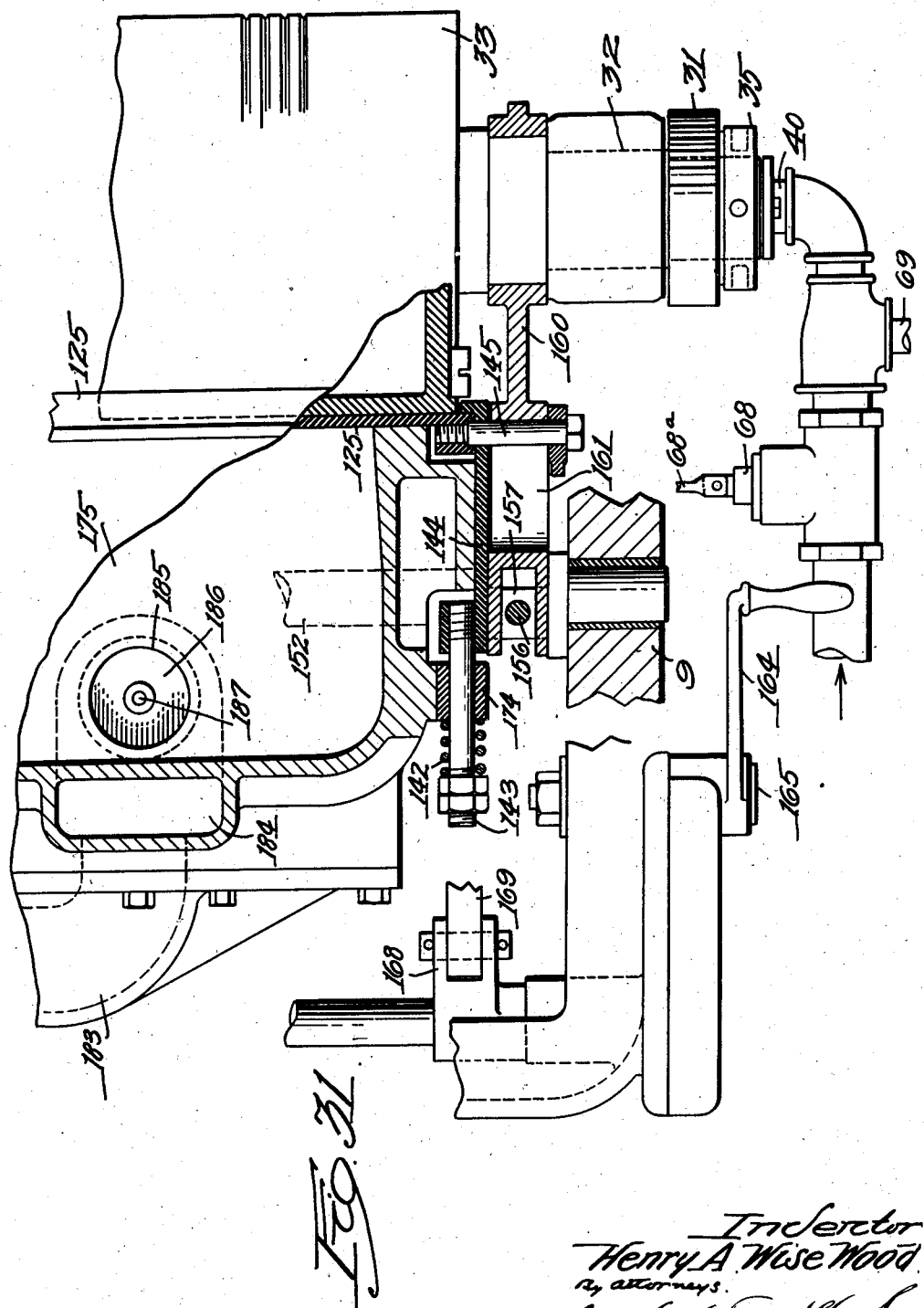

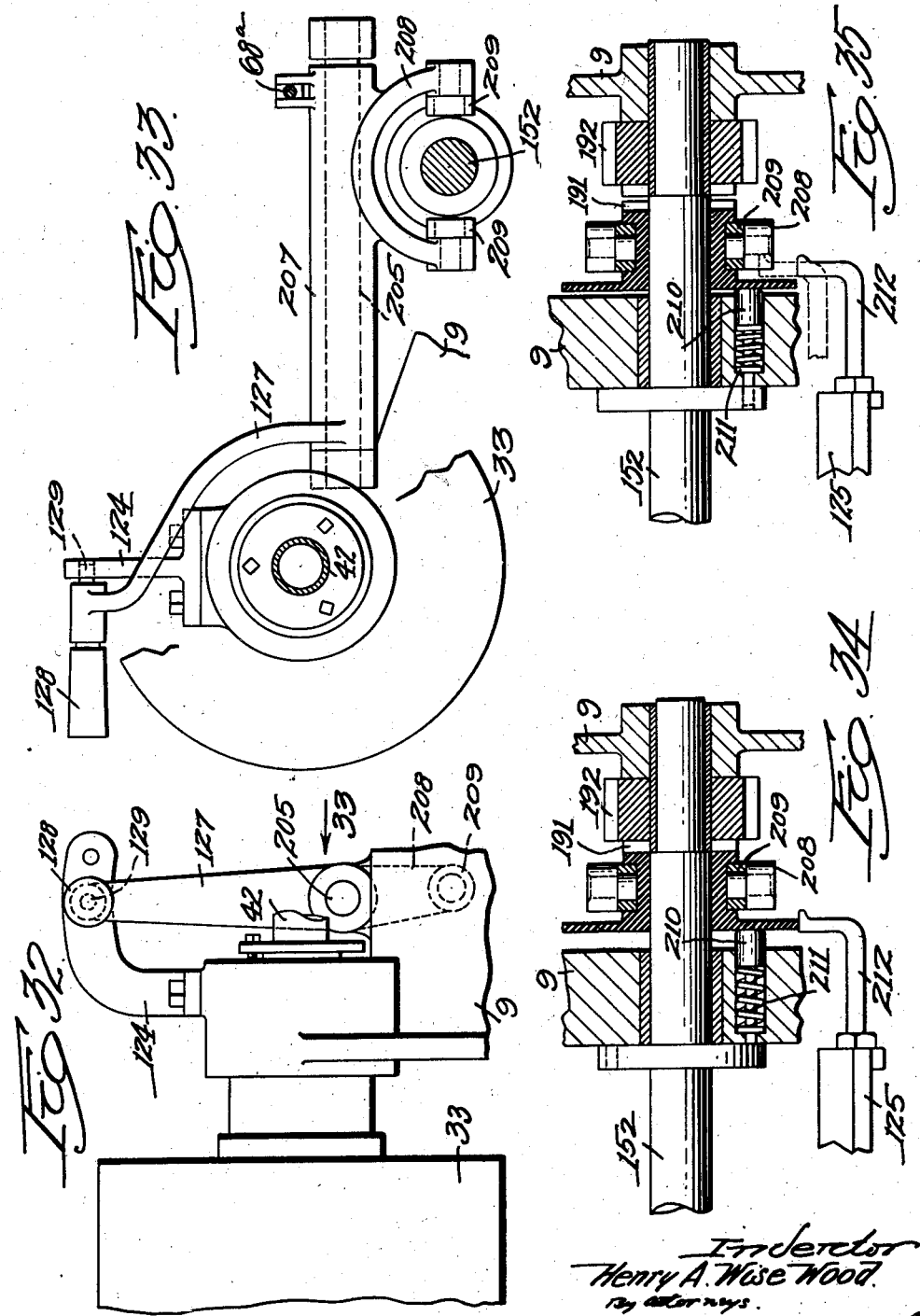

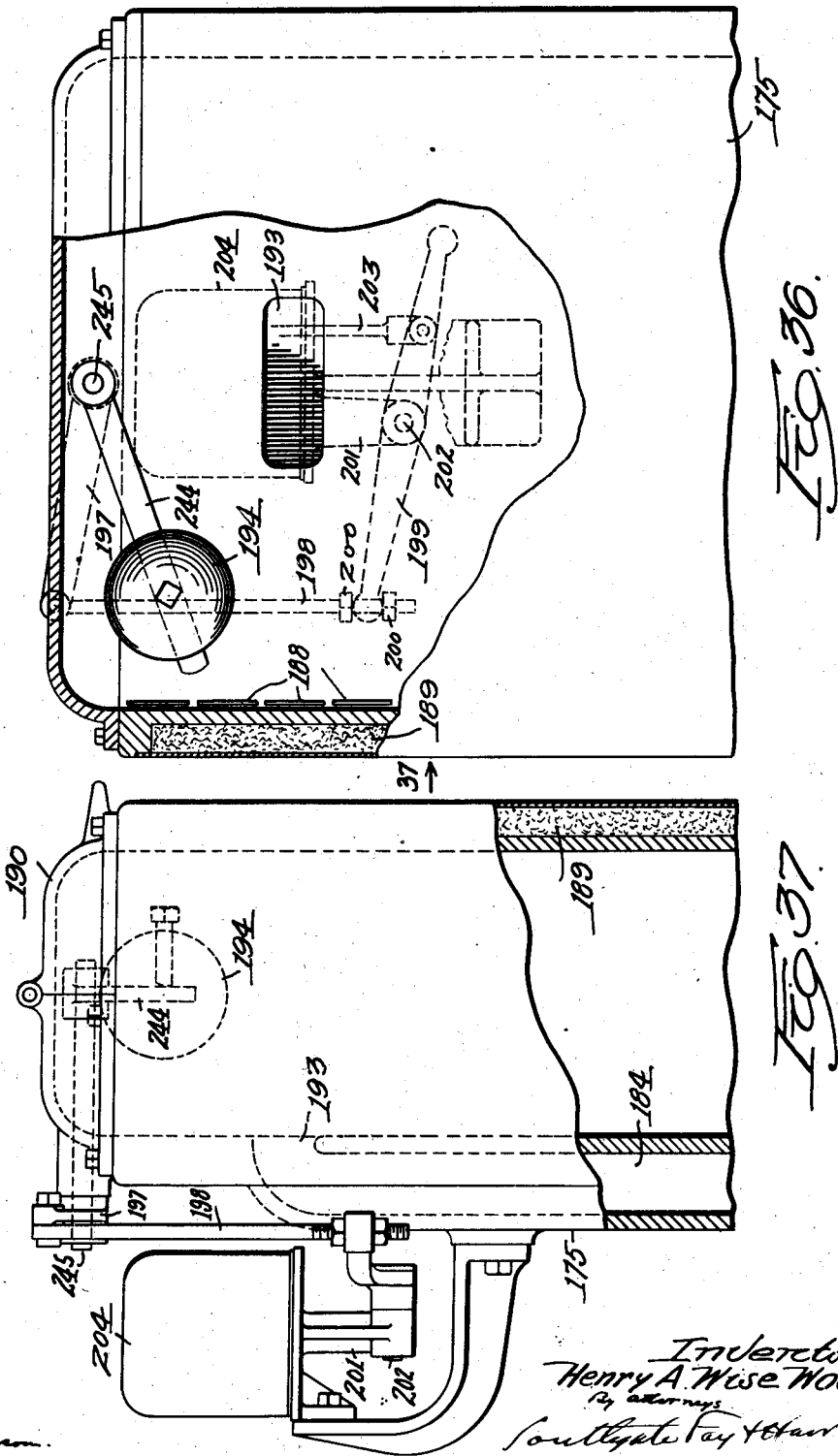

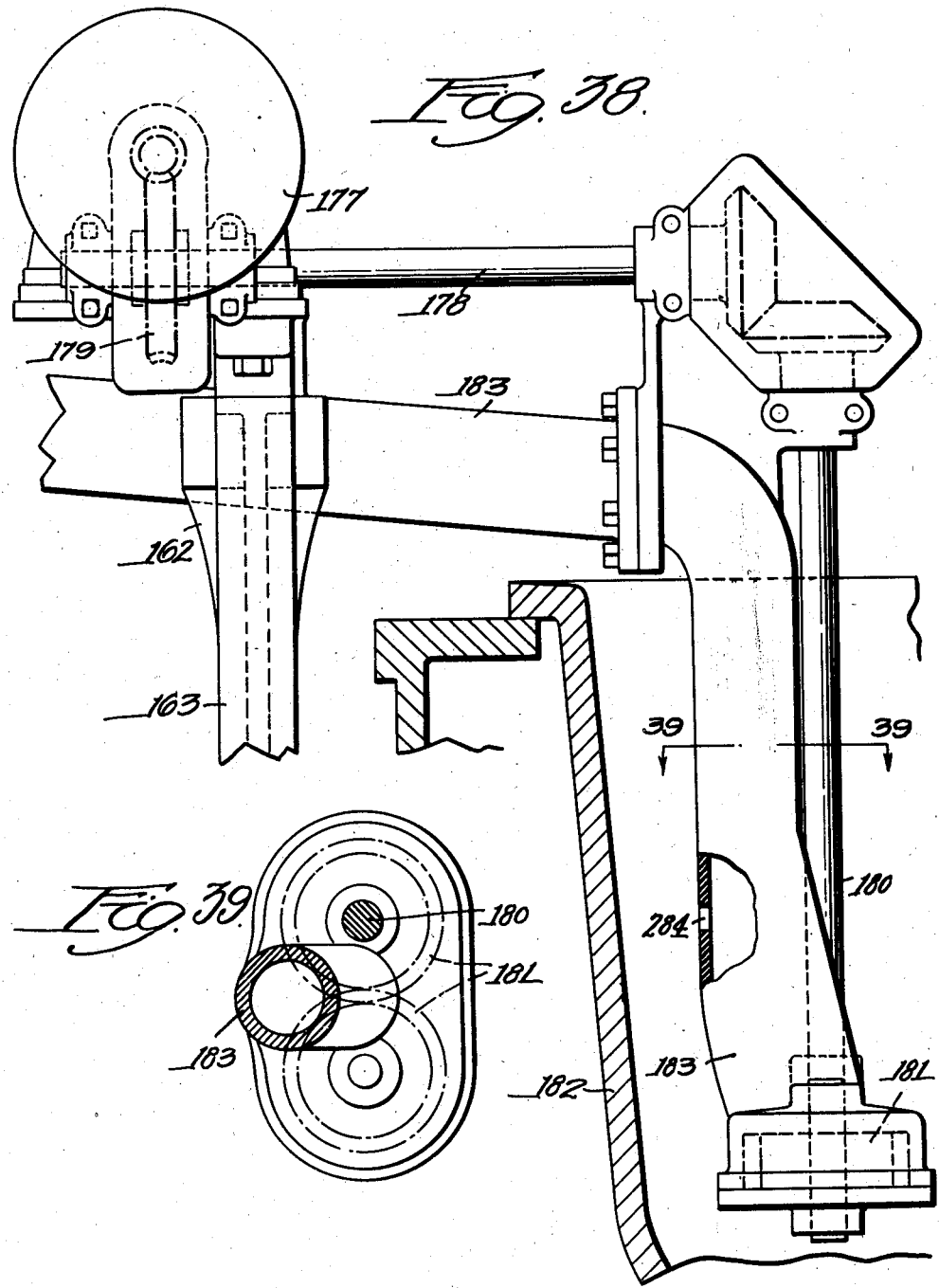

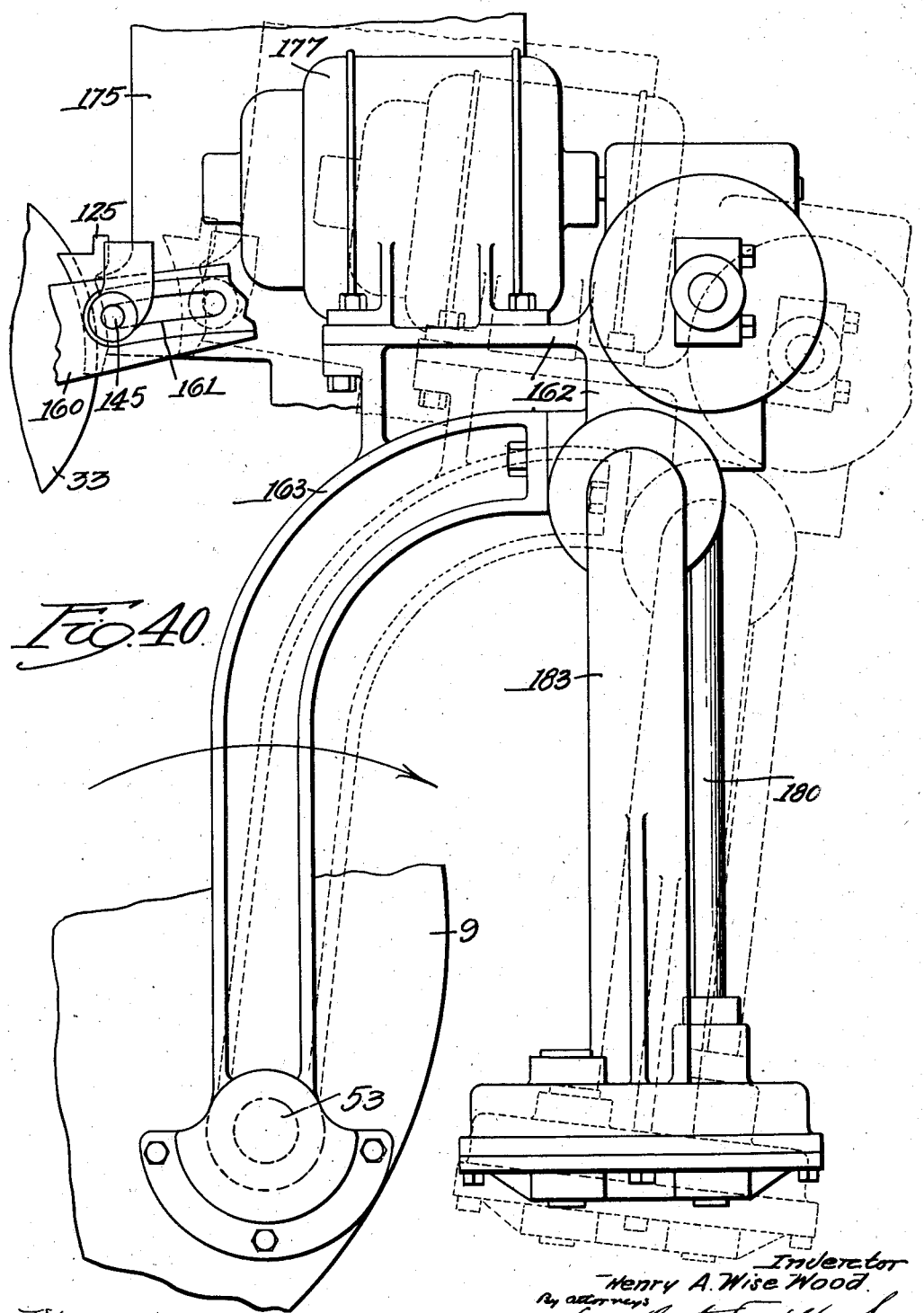

March 7, 1933.  H. A. W. WOOD  1,900,265
MACHINE FOR CASTING STEREOTYPE PRINTING PLATES
Original Filed Aug. 27, 1929   21 Sheets-Sheet 20
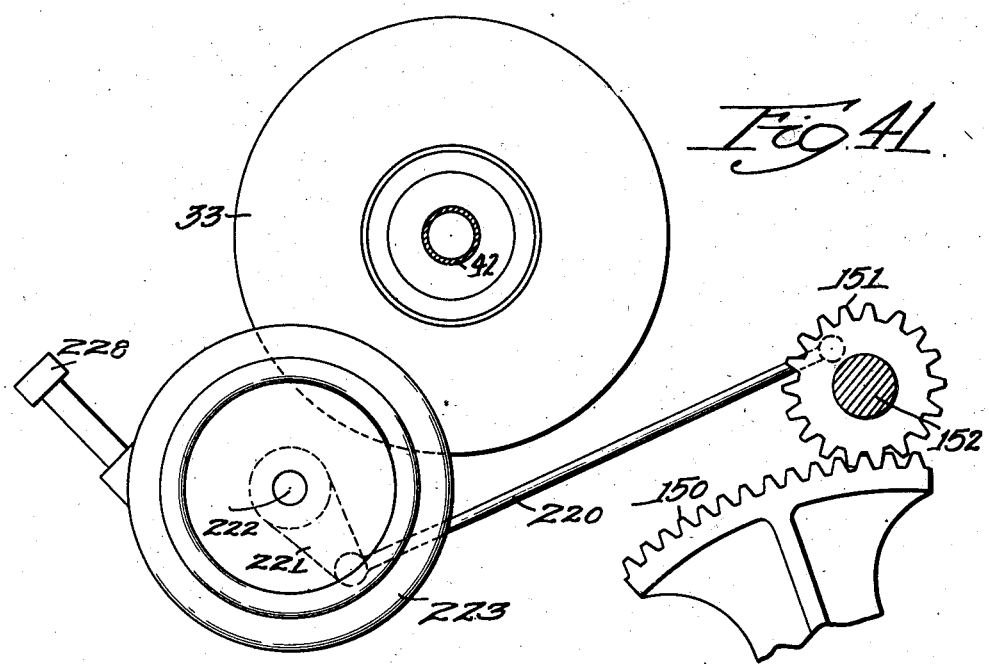
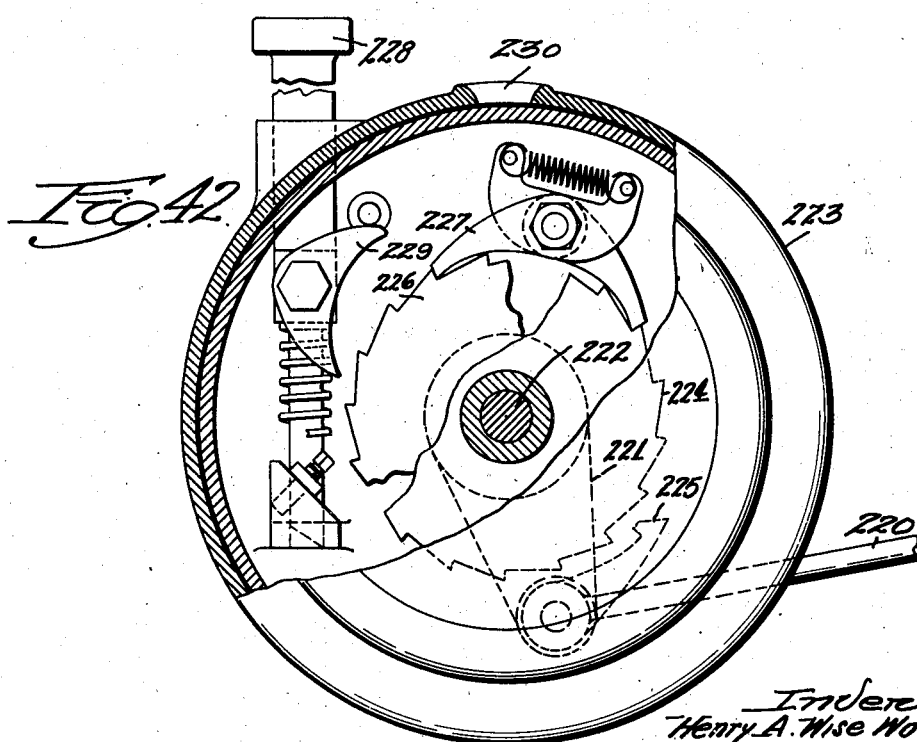

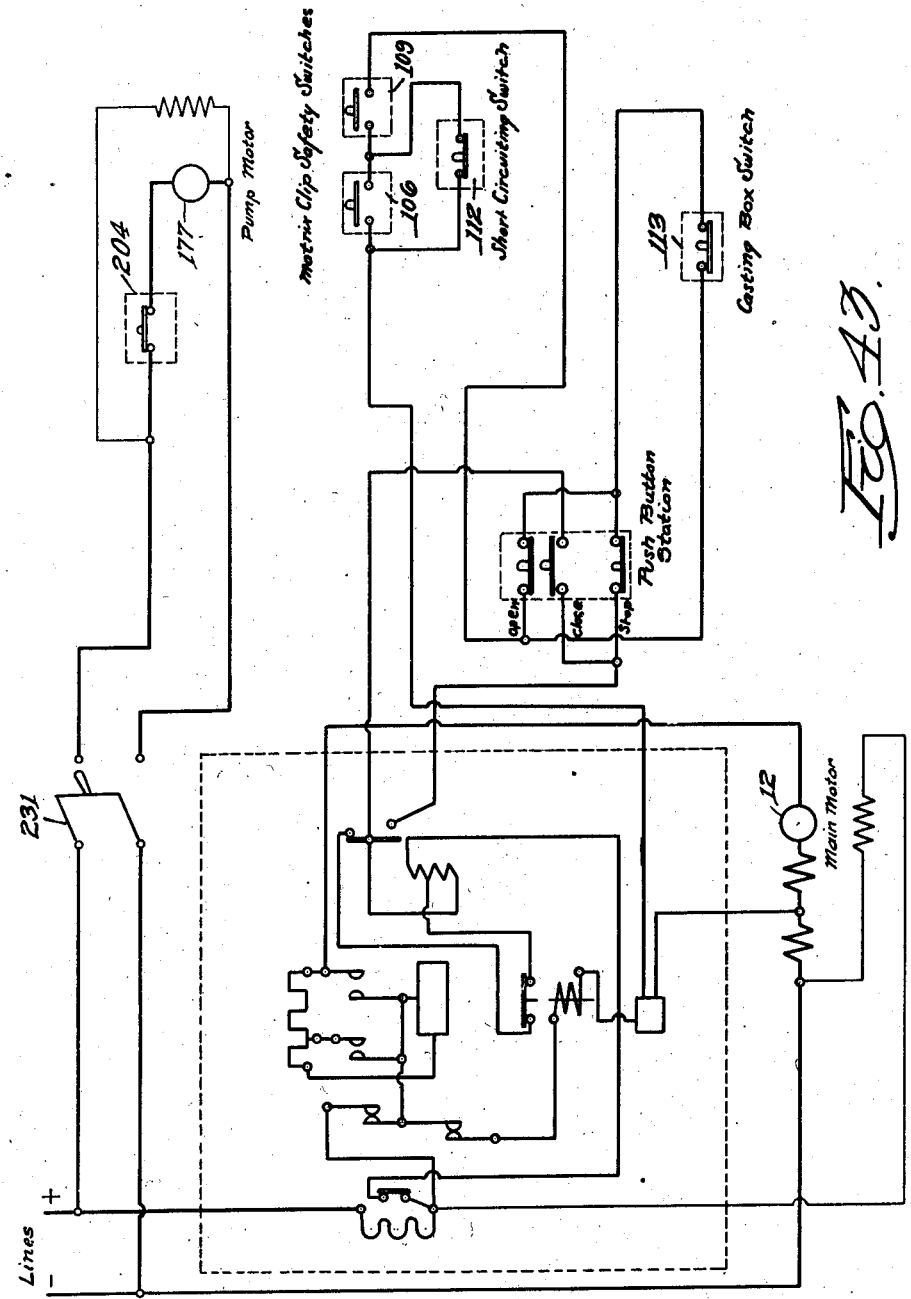

Patented Mar. 7, 1933

1,900,265

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

MACHINE FOR CASTING STEREOTYPE PRINTING PLATES

Application filed August 27, 1929, Serial No. 388,843. Renewed July 29, 1932.

This invention relates to a machine for casting riserless printing plates, according to the principles set forth in United States Patent, No. 1,673,857, issued June 9, 1928. I have also shown, but not claimed herein, some features covered by my application, Serial No. 228,847, filed June 28, 1928.

The principal objects of this invention are to expedite the production of riserless plates by reducing the time required for the half revolution of the cylinder necessary for removing the plate; to provide means for starting the motion of the heavy cylinder and co-acting parts slowly, accelerating gradually and retarding to an easy stop, thereby providing for ease of operation and improving durability; to provide improved means for operating the casting back to retract it so that the plates can be removed and the matrices stripped and replaced; to provide a straight-line motion of the casting back before the matrix stripping operation and rigidly fixing the locus of the motion of the casting back; to provide for insuring uniform operation and minimum strain on the prime mover casting back; to provide matrix bars which may be opened and closed when the clips are locked up; to provide a short-circuit switch in connection with the matrix bars which makes the line for connecting up the operating motor inoperative when, and only when, the matrix clips are closed; to provide simplified means whereby, when the casting back recedes from the cylinder, the plate lifter will clear the plate and as the casting back travels toward the cylinder the plate lifter will come in contact with the trailing side of the plate, follow the contour of the cylinder and lift the plate clear of the cylinder by the time the casting box is closed; to provide an improved set of segment rings on the ends of the cylinder; to provide a support for the plate when the casting back moves away from the cylinder and to provide means for operating them to release the plate; to provide an automatic signal adapted to operate just prior to the opening of the mold, adjustable to control the time of operation; to provide a metal hopper for receiving the metal from the pump and discharging it into the mold having a float which, when it rises above a certain level, stops the pump motor by electrical means and automatically connects up the electric circuit to the pump motor when the level of the metal gets too low, thus maintaining a constant level in the hopper automatically; to provide means for circulating the metal between the pump and hopper to submerge metal on the top of the hopper that has been circulated one or more times through the apparatus; to provide means for insuring a definite clearing of the hopper into the pump; to provide improved means for operating the gate which controls the admission of metal from the pump into the mold; to provide flexibility for the gate that closes the mold so that in case of a jam no injury is likely to be sustained; to provide means whereby the pump can be run for testing purposes without pouring metal; to provide means for preventing the moving of the hopper away from the mold when the gate is opened; to provide means for holding the gate securely against the hopper; to provide means for preventing the moving of the hopper away from the cylinder without first disengaging the gate operating mechanism; to provide means whereby the engagement of a single clutch controls the introduction of metal into the mold, the cooling water into the cylinder and back and the operation of a counter; and to provide a counter connected with the machine for counting the number of operations automatically.

Other objects and advantages of the invention will appear hereinafter.

Reference is to be had to the accompanying drawings in which

Fig. 2 is a plan of the casting machine;

Fig. 3 is a rear view of a part of the machine showing parts in section;

Fig. 4 is a sectional view on the line 4—4 of Fig. 3;

Fig. 5 is a face view of the Geneva wheel employed in this mechanism, shown in Fig. 4;

Fig. 6 is a similar view of the worm wheel;

Fig. 7 is a diametrical sectional view of the casting box cam and associated parts;

Fig. 8 is a face view of one side of the casting box cam looking in the direction of the arrow 8 in Fig. 7;

Fig. 9 is a face view of the other side of the casting box cam;

Fig. 10 is an end view of the back operating part of the machine, looking in the direction of the arrow 10 in Fig. 2 and showing the mold closed;

Fig. 11 is a sectional view of the same on the line 11—11 of Fig. 10;

Fig. 12 is a view of one end of the casting cylinder showing the rings in position;

Fig. 13 is an end view of the same;

Fig. 14 is a sectional view of the casting cylinder with the plate thereon showing the casting box drawn away and the position of the plate lifters at that time;

Fig. 15 is a similar view showing the contact of the plate lifter with the plate as the back starts to move toward the cylinder;

Fig. 16 is a similar view showing the completion of the removal of the plate from the cylinder;

Fig. 17 is an end view of the back and its operating and guiding mechanism showing the mold open;

Fig. 18 is a sectional view on the line 18—18 of Fig. 17;

Fig. 19 is an end view of the mold closed;

Fig. 20 is a similar view with the back drawn away from the cylinder to the extreme position;

Fig. 21 is a plan of the mold, showing the cylinder and side clips in position, looking in the direction of the arrow 21 in Fig 19;

Fig. 22 is an end view of the back;

Fig. 23 is a plan of part of a clip and matrix bar showing the clip closed and the matrix bar opened;

Fig. 24 is a similar view with the bar and clip closed;

Fig. 25 is a similar view showing the clip open and the matrix bar closed;

Figs. 26 and 27 are similar views simply showing the positions of the parts when the clip is closed and open respectively;

Fig. 28 is a transverse sectional view of the cylinder and the mold pouring hopper;

Fig. 29 is a similar view on enlarged scale showing the gate in closed position and the casting just finished;

Fig. 30 is a sectional view on the line 30—30 of Fig. 2;

Fig. 31 is a plan partly in section on the line 31—31 of Fig. 30;

Fig. 32 is an elevation of a clutch operating mechanism for controlling the motion of the hopper;

Fig. 33 is an end view of the same looking in the direction of the arrow 33—33 in Fig. 32;

Fig. 34 is a diametrical sectional view of the clutch and its shaft and associated parts showing it in the position with the clutch engaged;

Fig. 35 is a similar view showing the clutch disengaged;

Fig. 36 is an elevation, partly broken away to show the interior construction of the hopper with its float;

Fig. 37 is a view of the same looking from the side in the direction of the arrow 37 in Fig. 36;

Fig. 38 is a sectional view on the line 38—38 of Fig. 2;

Fig. 39 is a sectional view on the line 39—39 of Fig. 38;

Fig. 40 is a side view of the pumping mechanism and shown retracted from the cylinder; in dotted lines;

Fig. 41 is an end elevation of the means for operating the gate arm and counter;

Fig. 42 is an elevation, partly in section, of the counter, and

Fig. 43 is a wiring diagram.

Figure 1:
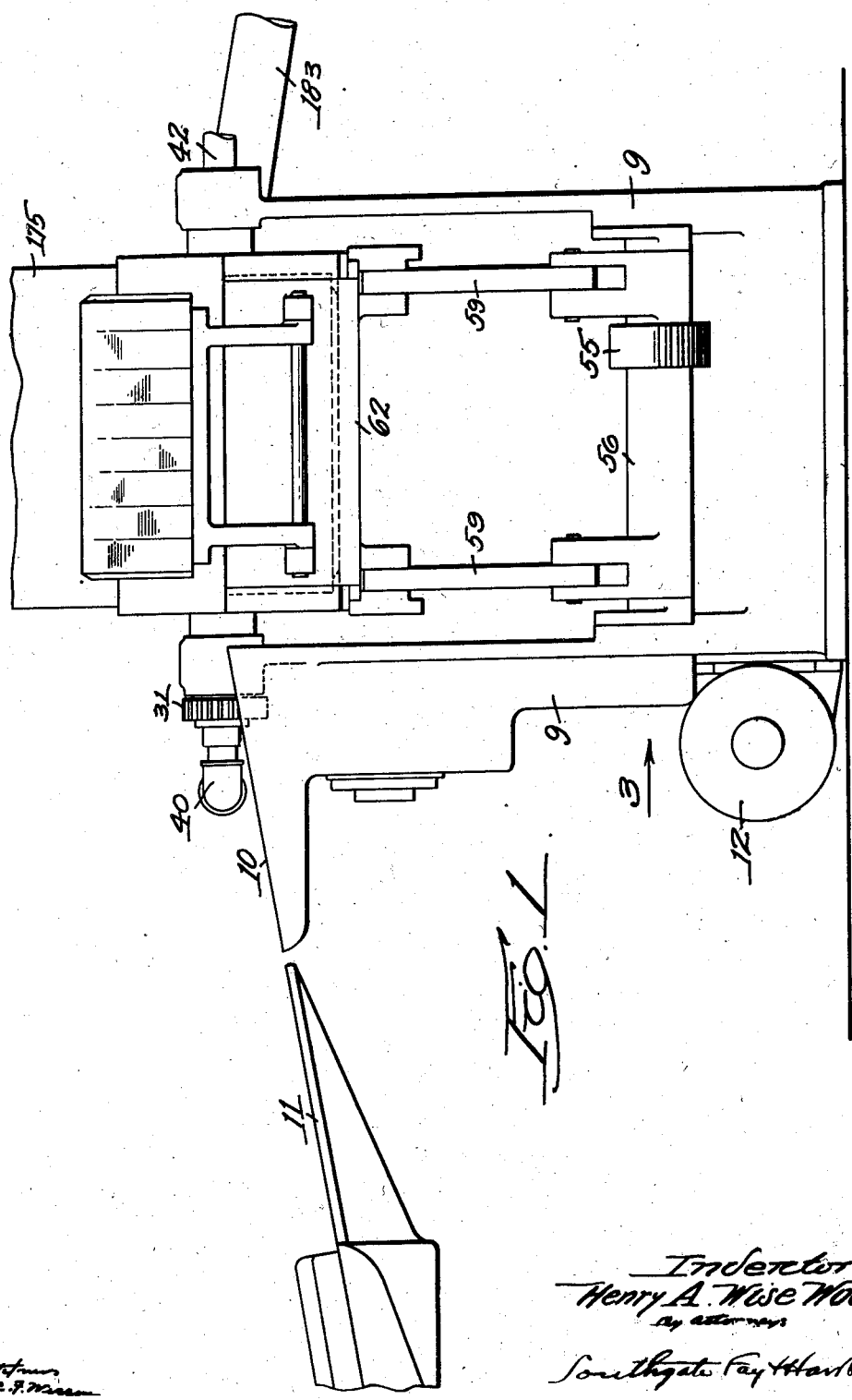
Fig. 1 is a side view of a casting machine constructed in accordance with this invention and showing it delivering to a gravity auto-shaver machine.

The invention is shown in a form which involves a frame 9 for supporting the entire apparatus. The casting produced, which in the form shown is a semi-cylindrical stereotype plate, is lifted from the cylinder of the mold and deposited on an inclined shelf 10 which is mounted on the frame 9 and it can be moved down a continuous incline into an auto-shaver machine 11, which is a well known machine for finishing the plate.

Near the bottom of the frame 9 is mounted a motor 12 which I call the main motor because it operates the heavy mold parts of the machine. This motor is provided with a sprocket 13 for delivering power to a sprocket 14 which is connected to a bearing hub 15 fixed to a shaft 16 by a shear pin 17 so that, if an unusual resistance is encountered, the shear pin will break and the machine stopped without damage to the other parts. On the shaft 16 is a worm 18 which has a ball bearing 19 at the end for taking the thrust. This worm rotates the main gear 20 with which it meshes and thereby rotates a shaft 21, which is the main power shaft of the machine.

*Cylinder and operating mechanism*

The worm gear 20 has a cam roll 22 which cooperates with a Geneva cam 23 having radial slots 24. In accordance with the well known principles of the Geneva motion, the Geneva wheel and its shaft 25 are rotated intermittently to produce, in this case, one fifth of a revolution at a time. The motion is started slowly, accelerated gradually and retarded finally to an easy stop. As will appear later this shaft 25 drives the heavy elements of the casting machine and the introduction of this motion at this time not only results in ease of operation but in durability of construction. It avoids the sudden starting or stopping of the parts and therefore is much more easy on the bearings and various other parts of the machine than would be an ordinary gear connection.

The Geneva wheel is kept from turning positively when the rolls are not in the slots 24 in the usual way by arc-shaped concave surfaces 38 on the wheel engaging the circular hub 39 on the gear.

At the ends of the cylinder 33 are segment rings 70 see Fig. 12 semi-circular in shape. They are mounted on the frame 9 by means of studs 71 extending longitudinally, or axially with respect to the cylinder, and are pressed against the end of the cylinder by springs 72. These studs 71 are secured in the frame by screw-threaded means to hold them in position and permit of longitudinal adjustment. The segment rings, as usual, are provided with semi-circular flanges 73 which extend over the cylindrical ends of the cylinder and they are bevelled to provide the casting surfaces which cast the bevelled ends on the stereotype plate. Also they provide a support for the plate when the casting box or back moves away from the cylinder.

As the cylinder revolves to deliver the casting on top, these segment rings remain stationary and still help hold the plate on the cylinder as long as it has engagement with them. When the cylinder has revolved to the position at which the plate is on top of the cylinder it no longer needs support from the segment rings. On the contrary it is necessary to remove the segment rings from contact with the plate in order to leave the plate free from the cylinder. For removing them, cam surfaces 74 are provided on the cylinder ends 37. They contact with complementary bevelled surfaces 75 on the inner sides of these segment rings and force them out longitudinally against the pressure of the springs 72. When the cylinder revolves back to casting position the cams 74 pass beyond the surfaces 75 and the springs 72 are free to force the segment rings back into casting position, as shown in Fig. 12.

The Geneva wheel is provided with a series of holes 26, five in number in the present case, for connection with the mechanism which drives the casting core. On the shaft 25 is a gear 27 which is provided with a driving pin 28 adapted to enter any one of the holes 26 to transmit power from the Geneva cam 23 to the gear 27. This gear is slidably mounted on the shaft 25. As shown in Fig. 4 the gear 27 is out of engagement with the Geneva wheel 23 and is locked to prevent rotation by the cooperation of the teeth on the gear 27 with the clutch teeth 29 on the shaft bearing, which is solidly secured to the frame of the machine. When the gear 27 is forced to the right, in Fig. 4, so that the pin 28 enters one of the holes 26, the gear 27 is rotated for transmitting its power.

The method of operating the clutch will be described later. The gear 27 meshes with a gear or pinion 31 on one of the bearings 32 on which the cylinder 33 of the mold is supported. The parts are so designed that when the Geneva cam rotates from one slot 24 to the next, in the present case, one fifth of a revolution, the cylinder 33 of the mold will rotate through half a revolution. The gear 31 is connected with one bearing 32 only by a shear pin 34 entering a bearing hub 35 keyed to the bearing 32. Here again we have the shear pin which will break in case of excessive resistance instead of causing the machine to break in some places where the repairs might cause a considerable delay and expense. The cylinder 33 is mounted on a pair of cylinder ends 37 which in turn are carried by their bearings 32 in anti-friction bearings, preferably mounted on the frame 9.

Cooling liquid is admitted to the cylinder by an inlet pipe 40 through a stuffing box in one of the cylinder ends. The cooling medium is applied in the form of a spray or jets by means of radial holes in the pipe 40. These holes can extend in any direction but they are shown in the drawings as spraying the top part of the cylinder inside. The cooling liquid which has been used is taken out through a siphon tube 41 connected to an outlet pipe 42. The latter passes through the stuffing box in that cylinder end to the drain.

*Back operating mechanism*

The shaft 21 is rotatably mounted in bearings on the machine frame and carries, as stated, a worm wheel 20 at one end and a pinion 44 at the other. This pinion meshes with an internal gear 45 mounted on a shaft 46, which is at about the same level, in the form shown, as the shaft 21. The shaft 46 is mounted in bearings on the frame 9. The gear ratio between the pinion 44 and the gear 45 is so designed that the internal gear makes one complete revolution per cycle while the worm wheel 20 makes an even number of revolutions per cycle.

On the end of the shaft 46 is a toe 47 which actuates the clapper of a bell 48. This toe is adjustable angularly which permits the setting of the ringing of the bell earlier or later in the cycle of operations. This is a warning bell which is set to ring just prior to the opening of the mold during a cycle of operations. It is mounted in stationary position on a bracket secured to the frame 9 of the machine.

The shaft 46, as stated, carries the gear 45. On the outside of the internal gear 45, which rotates continuously, is a ring 49 which has a cam groove 50 extending around it. In this cam groove runs a roll 51. This roll is mounted to rotate freely on a stud carried on a lever 52 which is keyed on a shaft 53 which has stationary bearings on the frame 9. The lever also has a gear segment 54 meshing with a gear 55 keyed on a crank sleeve 56. The crank sleeve 56 is supported by a fixed shaft 61 running through it and having bearings in the frame 9 at each end and accurately and firmly supporting the crank through a pair of bushings.

On this crank sleeve are two arms 57, each one provided with an eccentric stud 58 for mounting connecting rods 59. These eccentric studs can be turned to change the effective length of these arms by adjusting worms 60 carried by the arms. This adjustment, as will appear, provides for changing the up and down position of the casting box or back 62. The connecting rods are connected with the back by a pair of pins 66 also connected with slides 63 working between gibs 64. The gibs are adjustably secured to the frame 9 by screws 65 and permit lateral adjustment of the casting back with respect to the cylinder. The pins 66 carried by the slides project into brackets or lugs 67 on the opposite ends of the casting box.

It will be seen that the back is guided at points near its ends by the gibs 64 to move in a straight line radially away from the cylinder and toward it. For rigidly fixing the locus of the motion of the casting back to and from the cylinder in addition to the gibs 64 at a distance therefrom, thus securing a straight line motion during the stripping operation, the following mechanism is provided:

At the bottom of the casting box are two opposite projections 77 having adjusting screws 78 mounted therein. These screws adjust a bracket 79 to the proper position with respect to the center of the casting box. This bracket has extending down from it a central cam 80 which is provided with a cam slot 81 having straight sides throughout its upper part and an offset portion below. This cam slot is of the same width throughout and it bears against a finished circular portion of the crank sleeve 56 so that this crank serves as an additional guide for the casting back. This guide is so far removed from the slides 63 that we have two guiding points at one end, and one at the other, of the stroke of the casting box to prevent positively any swinging motion. At the extreme end of the stroke, where a slight change is made, the casting box moves inwardly toward the cylinder into exactly the right position. The adjustment by the screws 78 is provided with an easy adjusting construction and also will permit a follow-up of adjustment made on the gibs 64 in setting the casting box when the machine is first set up.

It is to be noted that the casting box 62 is hollow and provided with an inlet pipe 69 and outlet pipe for the admission and discharge of cooling water. This inlet pipe and the inlet pipe 40 for the cylinder 33 are both supplied through one valve 68 connected by a link rod 68ª operated by a trunnion lever 127 through a sleeve 207. When the lever is in the position shown in Fig. 32 the valve 68 is open, admitting water to the cylinder and back. The trunnion lever is operated by a handle 128 having a spring pin 129 for holding it in either of two positions with the pin in one of two holes in a bracket 124 on the frame 9.

To insure uniform operation and ease of strain on the prime mover the casting back is counterbalanced by a weight 82 connected with the casting box by a flexible connection or chain 83. This chain passes over idler pulleys 84 rotatably mounted on the machine frame 9 on studs. Of course, it will be understood that two of these counterbalance weights are employed and connected with the two ends of the casting box in the same manner.

The shaft 53, on which is the gear segment for operating the back, is also provided with an arm 130 keyed thereto. When the casting box is open, this arm is in the lowered full line position shown in Fig. 3 and when it is closed it is in the dotted line position. This arm operates on a collar 131 pinned on a rod 133. The rod has two bearings on the frame 9 in brackets 132 and 136 or projections carried thereby. Against the bracket 132 bears a spring 134 on the rod. The other end of this spring bears against a collar 135. The rod also has two collars 137 pinned thereto and between these is an arm 138 on a shaft 139 carrying a yoke 140 pinned thereto. The motion of the rod 133 therefore by action of the arm 130 swings this yoke 140 which has two pins or rollers bearing in a groove 141 on the hub of the gear 27.

It will be seen, therefore, that when the casting box is open and the arm 130 up, the gear 27 is pushed forward so that the pin 28 is in engagement with one of the holes 26 in the Geneva wheel 23. At this time the cylinder is being rotated. When the arm 130 is down, of course the casting back is closed and the Geneva wheel is disconnected from the gear 27.

*Matrix clip mechanism*

Clip mechanism is shown which locks up and strips the matrix in a manner well known in autoplate machinery. With some exceptions this mechanism is not different from that which has been shown in others of my patents.

The usual locking cams 86 are used on both sides of the machine. These are stationary cams mounted on the frame 9. To facilitate the changing of matrices a third locking cam 87 is employed on the pouring side of the machine for closing that matrix bar 88 when the casting box is in position for changing the matrix as shown in Fig. 20.

The locking cams 86 and 87 are duplicated on both ends of the casting box. The matrix bar 88 carries the matrix clip 89 and is held closed by the locking cam 87 which, when the parts are in this position, is engaged by a cam roll 90 on the locking lever 91. This locking lever and the matrix bar are rigidly mounted with respect to each other to turn on a longitudinal shaft 92 which is rotatably mounted on the casting box. For the convenience of the operator the clip 89 is opened and closed by a handle 93 on a shaft 94 which, by bevel gears, operates a shaft 95 having a diametrical notch in the end for receiving the projecting end of a stem 96 rotatably mounted on the matrix bar 88. On this stem is an arm 97 which is connected by a turn buckle arrangement 98 with the clip 89. This provides adjustment for the clip.

As shown in Fig. 22, the matrix bar may be opened and closed when the clip is locked up. As is common in autoplate machinery parts, a coil spring 99 is provided around the pivot shaft 92 on which the matrix bar is adapted to swing. The ends of this spring project out longitudinally, one being attached to a stationary part of the back 62 and the other to the matrix bar 89 which has a lug on it for that purpose. This spring holds the bar open except when closed by a greater force.

Stops 101 having inclined slots receiving screws 102 are adjustably secured to the matrix bar. This construction is provided to give rigidity to the clip when in locked position. The clip mechanism on the opposite side of the casting box is arranged in substantially the same way and is well known.

As this machine is power driven it is evident that an attempt to operate it with the clips or the matrix bars out of proper position would cause damage. Figs. 22 to 27 inclusive show the clip safety switches. A stud 103 is mounted on the clip 89 on the rear side of the box and bears against a lever 104 which is oscillatably secured to the casting box by a stud 105. The lever 104 is provided with a groove into which extends the roll 206 of an electric switch 106. This switch, as will appear by reference to the wiring diagram, is in the electric circuit of the main motor 12. Consequently only when the clip is locked and when the matrix bar on that side is open, as show in Fig. 23, can any contact be made in the switch 106 to allow the motor to be started. Otherwise this motor circuit is open. Fig. 23 shows the running position with the clip closed and the matrix bar open. Fig. 24 shows the clip closed and the bar closed. Fig. 25 shows the clip open and the bar closed. In these latter two positions the machine cannot be started.

The conditions are different with respect to the matrix bar 88 on the pouring side and its matrix clip. There is no possibility of closing the box with this matrix bar closed. Therefore it is only necessary to insure the closing of the clip. The clip end of the lever 107 does not carry any bevel locking lever 104. A stud 108 secured to the clip comes into contact with the lever 107 so that when, and only when, the clip on this side is closed can contact be made in the switch 109 which is like the switch 106 and is in series with the same circuit. This lever is mounted on a stud 110 on the casting back. Otherwise the parts are the same as on the other side.

Fig. 26 shows the clip on the pouring side closed which is the running position. Fig. 27 shows the clip open, in which condition the motor 12 cannot be started owing to the fact that the switch 109 is open. With the switch 106 in the stop circuit of the motor 12, it is apparent that, when in normal operation, the matrix bar on the rear side of the machine closes by its locking lever roll bearing against the locking cam 86 and on the back side, the motor 12 would stop because of the open circuit in the switch 106.

To obviate this undesired stoppage a short circuiting switch 112 is provided. This switch is operated by a raised surface 114 on the crank 56. This makes the switch 106 inoperative when, and only when, the matrix bar 88 on the rear side is closed through the action of the locking cam 86.

A switch 113 is operated by a raised surface 114 on the crank 56 and is so connected that when the "open" button of the push button station is depressed, the casting box will open and stop the machine automatically, if it is in operation, in the matrix changing position. Mechanical details of ordinary construction are provided on the "open" button so it will be unnecessary for the operator to hold his finger on this button so he will be able to leave it and procure the next matrix.

*Plate lifting mechanism*

On the shaft 21 which makes one revolution per cycle is a cam 115. This cam operates a roll 116 on a cam block 117 which is pivoted to swing on a stud 118 carried by the frame 9. This cam block 117 has a cam groove in it which operates a roll 120 on a plate lifter 121. The plate lifter is pivoted on a bracket 122 secured to the casting back 62. On account of uneven distribution of the weight the plate lifter will remain open normally by gravity, as shown in Fig. 17, when the roll 120 is freed from the cam slot in the cam block 117.

The plate lifter has a lug 123 which is moved by gravity against the back 62 to limit the position of the plate lifter and thus fix the locus of the cam roll 120 and leaves it in such position that when the casting back moves up toward the cylinder from the position shown in Fig. 17 the roll 120 enters the bottom part of the cam block groove and finally the lifter comes in contact with the trailing side of the plate as shown in Fig. 15. At this point the cam 115 is in its maximum position, that is, it throws the roll 116 as far as it can to the left. On further lifting of the casting back the roll 116 remains in the same position and the roll 120 following the shape of the cam slot in the block 117 sets the plate lifter under the plate and lifts it clear of the cylinder as shown in Fig. 16. At this time the leading side of the cast plate comes to rest against the gate 125 on the other side of the cylinder, as shown in that figure.

It will be noticed that between the position shown in Fig. 15 and that shown in Fig. 16 the cam roll 120 is swung out to the right by the shape of the cam slot in the block 117 to allow the plate lifter to hold the plate at a point below the axis and move around the cylinder with it and inwardly along the upper face of the cylinder to the point shown in Fig. 16 without engaging the surface of the cylinder. On the reverse motion, as the casting box recedes from the cylinder, the plate lifter clears the plate and the roll 120 finally leaves the cam block 117. On withdrawal of the casting back the cam 115 swings the roll 116 to the right and thereby moves the cam block 117 about its pivot to the right, as shown in Fig. 14, thus moving the plate lifter away from the cylinder.

Gate operating mechanism

This completes all the parts of the mold except the gate 125. This gate has a concave cylindrical surface on one side fitting the cylinder 33. On the outer side it is convex and tapered for closing off the metal connection to the mold. The upper surface of the gate is L-shaped for receiving the cast plate as shown in Fig. 16 and previously described herein. The ends of the gate are provided with outboard bearings for receiving pins 145 by which the gate is operated. It is necessary to open and close the gate by an arcuate motion about the cylinder once during each cycle of operations.

The ring 49 has on the side opposite the cam groove 50 a gate-opening cam 146 for receiving a cam roll 147 on a gate lever 148 which is pivotally mounted on a shaft 149 which is mounted in fixed bearings in the frame 9. This cam obviously oscillates this lever which, at its upper end, has a gear segment 150 arranged to mesh with a gear 151 and oscillate it. This gear is mounted on a crankshaft 152 which is mounted in three bearings on the frame.

The closing motion is obtained from a cam 153 which is adjustably secured to the back of the internal gear 45. This cam is adjustable circumferentially, thus permitting time setting of the closing of the gate. The friction of the gate between the cylinder and the parts behind it will hold the gate and its connecting members in any position without additional attention. The cam roll 147 is controlled by the cams 146 and 153.

The crank shaft 152 is provided with a pair of cranks 155. Each of these cranks is provided with a rod 156 which is adapted to operate a stud 157 through which the rod passes and between collars on the stud slidably mounted and on the ends of the rods are springs 158, one of these springs being held and adjusted by nuts 159. Studs 157 are mounted on gate arms 160 at each end of the cylinder. The gate arms are pivoted on the central bearings 32 of the cylinder and have a small orbit of oscillation. The gate arms are provided with elongated slots 161 for receiving the gate pins 145. These slots are made long to allow motion of the gate pins when the hopper and gate are moved away from the cylinder, as will appear.

The gate 125 receives its motion from these two gate arms 160 to open the mold, to allow metal to be poured, and then close it and force the surplus metal out and also force some metal, while in plastic or fluid state, back into the mold and put it under pressure enough to produce a sharp casting.

Pumping and pouring mechanism

The pumping and pouring mechanism is mounted on a frame 162 which is provided with a pair of brackets 163 extending down from it and pivoted on the shaft 53. They are the sole support of the frame 162. The frame 162 is swung back and forth about the shaft 53 by a handle 164 pivoted on a shaft 165. With this handle is connected a gear segment 166 operating a segment 167 with which it meshes. This gear segment 167 is pivoted on a stud and provided with an integral arm 168 which is pivoted to a toggle link 169. This link is provided with a fixed collar 170 against which is carried a spring 171 on the link. The link also is provided with two collars 172 on opposite sides of a shaft 173 through which the toggle link 169 passes.

The shaft 173 is rotatably mounted on a bracket 174 which is detachably but fixedly secured to the metal pouring hopper 175. By the operation of the crank arm 164 the hopper is moved toward and from the cylinder by this arrangement. The forward motion of the hopper is limited by its contact of the gate 125 with the cylinder. Pressure is exerted by the springs 171 to make the contact firm but not absolutely positive. Also bearing on each of the two brackets 174 is a spring 142 on a rod 143. These rods are screwed into clamps 144 having toes extending toward each other for holding the gate 125 firmly but yieldingly against the hopper at all times. It will be understood that both ends of the gate are held against the hopper in a similar manner.

The limit of the angular motion of the handle 164 is determined by lugs on the machine. The closing limit is such that the crank arms 168 are slightly above the center line between the shafts on which the segment gears are mounted.

The pump is an ordinary gear pump operated by a motor 177 mounted on the frame 162 which carries the pump. This motor drives a shaft 178 through reducing gearing 179 and through bevel gears the shaft 178 drives the pump shaft 180 on which is one of the gears 181 constituting the pump. This pump, of course, is located in a melting pot 182 which is stationary. The pump is movable about the pivot shaft 53. The pump delivers through a delivery pipe 183 which is provided with a drain opening 284 near the bottom and discharges into the bottom of the hopper. The hopper is provided with a channel 184, extending upwardly into which the surplus metal can pass, and is provided with an inlet port 185 adapted to be closed by a float valve 186 which is guided on a pin 187. The channel 184 and float valve 186 provide for a healthy circulation of metal during the casting period for, as the supply in the hopper is diminished by the pouring of a plate, new metal is pumped in which travels up through the channel 186 and is fed into the top of the hopper. This prevents metal from being used from the bottom of the hopper and refilled to the bottom of the hopper without proper movement of metal in the top of the hopper.

The valve 186 is provided so that the metal will drain back into the melting pot at the conclusion of the operation. In most cases, there is enough leakage through the teeth of the gear pump to allow the metal to drain back from the hopper but to insure a definite clearing of the hopper and delivery pipe the drain hole 284 previously mentioned is provided. This hole must be large enough to allow a free flow of metal but small enough to cause only a slight amount of metal to be by-passed and thus only a slight reduction in the amount pumped to the hopper.

The temperature of metal is maintained in the hopper by electric heating units 188 and insulating material 189 is provided. The front half of the hopper is provided with a cover 190 hinged to allow opening for inspection.

The hopper is so constructed that when metal rises in it to the level of a float valve 186 the latter will rise with the in-flow of metal and close the port 185 in the lower part of the hopper. This port being closed, the metal coming up the spout 183 rises up the rectangular channel 184 in the rear of the hopper until it is forced into the main chamber of the hopper through a port 193 in the partition between the hopper proper and the channel 184.

When the main chamber is filled to the level of this latter port, the metal continues to rise in both chambers until a ball float 194 is buoyed up by the rise of metal. This float then acts through an arm 244, shaft 245, which is mounted in bearings on the hopper cover, and an arm 197, also on this shaft, to raise a link 198 pivotally depending from the end of the latter arm. This link 198 passes through a lever 199 to which are attached collars 200 between which the end of the lever acts. The lever 199 is rotatably mounted on a switch bracket 201 by a pin 202. The movement of this lever operates a link 203 which makes an electric contact in the switch 204 mounted on the hopper. This switch is located in the circuit of the motor 177 and the pump is stopped. During normal operation, when the metal level is such that the ball float 194 sinks sufficiently, electrical contact is re-established in the switch 204, causing the pump motor to start. In this way, a constant level is automatically maintained in the metal hopper.

It is desirable to be able to run the machine without pouring the metal and it is very necessary that the hopper be not moved away from the mold with the gate open and that the gate be held securely against the hopper. The first of these objects is accomplished as shown in Figs. 33, 34 and 35 by the clutch 191 being disengaged from the clutch teeth of the pinion 192. Angular motion of the handle 128 on the yoke arm 127 which is secured on a sleeeve 207 is employed to disengage the clutch. The shaft 205 on which the sleeeve is mounted is carried in bearings on the frame 9 of the machine and the sleeve 207 thereon on which the lever 127 is mounted is provided with yoke arms 208 having rolls 209 entering a groove in the movable member of the clutch for moving it back and forth along the shaft 152. As it is desirable that the relative angular relations of the clutch and pinion be the same during every engagement, the clutch teeth are so designed that they will engage in only one position relative to each other. To insure closure of the gate, however, the clutch is disconnected from the pinion. A locating pin 210 is provided which is kept bearing against the clutch by a spring 211. This pin and spring are carried by an opening or hole in the frame 9. When, and only when, a hole in the flange of the crankshaft 152 registers with the locating pin 210 can the clutch be disengaged. The position of the crankshaft then is such that the gate is closed and that position cannot be changed so long as the locating pin engages in a hole in the crankshaft flange and the clutch is disengaged from the pinion.

Should the hopper be moved away from the cylinder without disengagement of the gate operating mechanism, it would be possible to cause damage if the machine should be operated. To eliminate this danger, a toe 212 is attached to the hopper so that when, and only when, the gate clutch is disengaged can the hopper be moved away.

Fig. 35 shows the clutch disengaged so that the hopper can be moved away, but Fig. 34 shows the toe bearing against the clutch, thus preventing motion of the hopper away from the cylinder.

It will be seen that the engagement of the clutch and pinion results in the introduction of metal into the mold and of water into the cylinder and casting box. As will be seen below, it also results in a count per cycle registered on the counter which will be described below. None of these three things can happen when the clutch and pinion are disengaged.

Counter

The machine is provided with a counter of a known type operated from the gear segment 150 and shaft 152. On the gear 151 of this shaft is a crank which operates a link 220.

The link obviously reciprocates and oscillates an arm 221 on the counter shaft 222. On this shaft is a counter 223 which operates in substantially the same manner as in my previous application, Serial No. 288,847, above mentioned.

The counter involves a ratchet wheel 224 and a pawl 225 with a substracting ratchet 226 and pawl 227 together with a spring-pressed head 228 to set the back counter acting through a double pawl 229. The detailed action of the counter need not be taken up as no claim is made to the counter in this case. It permits motion of the counter dial in either direction and, as shown, carries thirty-six spaces, only one of which is shown at a time in the counter opening 230.

As the crankshaft 152 operates the gate, it will be obvious that when the gate is opened and closed the counter is moved forward one notch or, in the illustration given, one thirty-sixth of a revolution. Furthermore the count is operated mechanically only when the gate is operated.

Operation

The switch 231 furnishing power to the pump motor is closed and the pump motor fills the hopper and automatically maintains the molten metal at a proper level therein. Now if the casting box is open (Fig. 20), the operator places the matrix in the box, closes up the matrix bar, locks up the two clips and opens the controllable matrix bar on the other side. The handle 128 is operated to engage the clutch 191 with the pinion. The "close" button of the circuit is then pressed and the main motor 12 started thereby. As the casting box rises the matrix bar opens on one side and then both clips close up around the rings at the ends of the cylinder. The matrix clip on the pouring side of the cylinder carries a slight projection 232 which seals against the bottom of the hopper.

As soon as the casting box is closed the gate opens and allows metal to fill the mold, the same action causing the count to be registered. Just before the metal solidifies in the gate opening, the gate is forcibly swung around on the cylinder. This pushes in what metal is needed to prevent shrinkage and pushes the excess back into the hopper. The water is forced in both the back and the cylinder when the handle 128 is operated, the bell rings, and the casting begins moving away from the cylinder. By the time the back and matrix are clear of the plate the pin 28 has engaged the hole in the gear 23 and the action of the cam roll on the Geneva cam has set the cylinder to rotating slowly. The speed of the cylinder carrying the plate around accelerates to a maximum at about one quarter of a revolution and then decelerates to zero at the end of a half revolution.

Toward the end of this half revolution, when the casting box has descended to its lowest position and has begun to return, the plate lifter touches the trailing edge of the plate as the leading edge of the plate touches the top edge of the gate. Simultaneously with the lifting of the plate from the cylinder the segment rings at the ends of the cylinder are forced back from the cylinder longitudinally or axially by the cam surfaces on the cylinder ends. At the closed position the rings have come back to their normal casting position. The gate then opens and admits metal for another plate and the cycle goes on until the desired number of plates is cast and registered on the counter.

As it is usually desirable to deliver the last plate completely and not leave it half delivered while the mats are being changed, the gate clutch is disconnected by the handle 128 just as the bell rings before delivering the last plate. The machine is allowed to make one more cycle and then the "open" button is depressed. This causes the machine to come to a stop in the position for changing the matrices.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:

1. In a stereotype plate casting machine, the combination with a cylinder and back, of a shaft, cranks rotatable on said shaft for moving the back toward and from the cylinder, and a projection extending from the back and having a cam slot surrounding said shaft, said shaft having a finished surface thereon entering said slot and constituting a guide for fixing the direction of movement of the back.

2. In a casting machine, the combination with two mold parts, of a cam mounted on one of them and extending away from it and having a cam slot, a finished surface passing through said cam slot for guiding the mold part, a pair of slides connected with the ends of the movable mold part, stationary guides for said slides, and adjustable gibs in the guides for engaging the slides.

3. In a casting machine, the combination with two mold parts, of a cam adjustably mounted on one of them and extending away from it and having a cam slot, a crank connected to the movable mold part for operating it and having a concentric finished surface passing through said cam slot for guiding the mold part, a pair of slides connected with the ends of the movable mold part, stationary guides for said slides, and adjustable gibs in the guides for engaging the slides.

4. In a stereotype plate casting machine, the combination with a cylinder and back, of a shaft, an electric motor connected to operate said shaft, a cam fixed on the shaft, a pivoted gear segment having a cam roll thereon to be operated by said cam, a crank, a gear fixed to said crank and meshing with the gear segment, whereby the crank is oscillated by the rotation of the shaft once during each rotation thereof, said crank being connected for operating the back of the casting box, and means for guiding the back to move in a straight line.

5. In a stereotype plate casting machine, having a cylinder and back, the combination of a shaft, a motor connected to operate said shaft, a cam fixed on the shaft, a pivoted gear segment having a cam roll thereon in position to be operated by said cam, a crank, a gear fixed to said crank and meshing with the gear segment, whereby the crank is oscillated by the rotation of the shaft, the crank being connected to the back of the casting box, and a counterweight for assisting in lifting the back.

6. In a stereotype plate casting machine, the combination with a cylinder and a movable back, of a motor, a shaft connected to be operated by said motor, a cam on the shaft, a crank for operating the back, means connected with said cam for oscillating the crank to move the back toward and from the cylinder, a cam on said crank and a switch in the motor circuit for opening it, said cam being so shaped and located that it will open said switch and stop the back in its retracted position for the purpose of allowing the changing of matrices.

7. In a stereotype plate casting machine, the combination with a cylinder and back, of a shaft, means for operating said shaft, a cam fixed on the shaft, a pivoted gear segment having a cam roll thereon to be operated by said cam, a crank for operating the back, a gear fixed to said crank and meshing with the gear segment, whereby the crank is oscillated by the rotation of the shaft, and an audible alarm adjustably connected with the cam shaft for giving the signal when the back is ready to open.

8. In a semi-cylindrical stereotype plate casting machine, the combination with a cylinder and a back, of a shaft, means for rotating the shaft, a Geneva wheel, means for rotating the Geneva wheel intermittently from the shaft, means for rotating the cylinder a half a revolution at a time from the Geneva wheel, a gear on the shaft, an internal gear meshing with said gear and having a cam mounted thereon, and means operable by said cam for reciprocating the back toward and from the cylinder.

9. In a semi-cylindrical stereotype plate casting machine, the combination with a cylinder and a back, of a shaft, means for rotating the shaft, a Geneva wheel, means for rotating the Geneva wheel intermittently from the shaft, means for rotating the cylinder a half a revolution at a time from the Geneva wheel, whereby the cylinder will start and stop slowly and accelerate and decelerate gradually.

10. In a casting machine, the combination with a rotatable cylinder and a reciprocable back forming the mold, of a shaft, means operated by the shaft for rotating the cylinder half a revolution at a time with a slow start, a gradual acceleration, and an easy stop, means operated by said shaft for moving the back toward and from the cylinder and means at a distance from the back for guiding it.

11. In a stereotype plate casting machine, the combination with a shaft and a motor for operating it, of a Geneva wheel operated by said shaft, said Geneva wheel having holes therein, a gear mounted concentrically with respect to the Geneva wheel and having a plug adapted to enter any one of said holes to connect the wheel and the gear at certain definite points only, a cylinder, a back, and means operated by said gear for rotating the cylinder intermittently.

12. In a stereotype plate casting machine, the combination with a cylinder and back constituting a mold, of a shaft and a motor for operating it, a Geneva wheel operated by said shaft having holes therein equal in number to its Geneva slots, a gear mounted concentrically with respect to the Geneva wheel and having a plug adapted to enter any one of said holes to connect the wheel and the gear, means operated by said gear for rotating the cylinder intermittently, a cam operated by the shaft, an arm adapted to be oscillated by said cam, mechanism for drawing back the gear so that the plug will not enter one of said holes and holding the gear in stationary position, means operated by said arm for actuating said mechanism, and yielding means for moving said mechanism in the opposite direction and the gear into position to connect it with the Geneva wheel.

13. In a stereotype plate casting machine, the combination with a cylinder and back constituting a mold, of a shaft, a Geneva wheel operated by said shaft having holes therein, a gear mounted concentrically with respect to the Geneva wheel and having a plug adapted to enter any one of said holes to connect the wheel and the gear, means operated by said gear for rotating the cylinder intermittently, mechanism for drawing back the gear so that the plug will not enter one of said holes and holding the gear in stationary position, and means operated by said shaft for actuating said mechanism.

14. In a stereotype plate casting machine, the combination with a cylinder and back constituting a mold, of a shaft, a Geneva wheel operated by said shaft having holes therein, a gear mounted concentrically with respect to the Geneva wheel and having a plug adapted to enter any one of said holes to connect the wheel and the gear, means operated by said gear for rotating the cylinder intermittently, mechanism operated by the rod for drawing back the gear so that the plug will not enter one of said holes and holding the gear in stationary position, a shaft connected to the first shaft to be oscillated thereby, an arm on the second shaft, a rod connected with the arm to be moved thereby, and a spring for retracting the rod.

15. In a stereotype plate casting machine, the combination with a rotatable cylinder and a reciprocable back, of a motor, means connected with the motor for intermittently rotating the cylinder a half revolution at a time, means connected with the motor for reciprocating the back, matrix bars carried by the back, matrix clips associated with the bars, switches in the motor circuit, a lever connected with each matrix clip and means on said levers for opening the respective switches when the clips are open, whereby the motor cannot be started and the machine cannot be operated except when the matrix clips are closed.

16. In a stereotype plate casting machine, the combination with a rotatable cylinder and a reciprocable back, of a motor, means connected with the motor for intermittently rotating the cylinder, means connected with the motor for reciprocating the back, a matrix bar carried by the back on the side opposite the pouring side, a matrix clip associated with the bar, a switch in the motor circuit, a lever connected with the matrix clip and means on said lever for opening the switch when the clip is open and the matrix bar is open, whereby the motor can be started and the machine can be operated only when the matrix clip is closed, and the matrix bar is open.

17. In a stereotype plate casting machine, the combination with a rotatable cylinder and a reciprocable back, of a motor, means connected with the motor for intermittently rotating the cylinder, means connected with the motor for reciprocating the back, matrix bars carried by the back, matrix clips associated with the bars, two switches in the motor circuit, a lever connected with each matrix clip, means on said levers for opening the respective switches when the clips are open whereby the motor cannot be started and the machine cannot be operated except when the matrix clips are closed, a matrix bar on the rear side of the back adapted to close during a cycle of operations, a short circuiting switch and means whereby the operation of the motor will close the short circuiting switch and allow the motor to continue to run even though the matrix bar on the rear side of the machine is closed.

18. In a stereotype plate casting machine, the combination with a rotatable cylinder and a reciprocable back, of a motor, means connected with the motor for intermittently rotating the cylinder, means connected with the motor for reciprocating the back, matrix bars carried by the back, matrix clips associated with the bars, a switch in the motor circuit, a lever connected with each matrix clip and means on said levers for opening the respective switches when the clips are open, whereby the motor can be started and the machine can be operated only when the matrix clips are closed, and an additional switch operated by mechanism connected with the motor and connected with the "open" button of the electric system for opening the casting box and stopping the machine automatically with the back in the matrix changing position.

19. In a casting box for stereotype printing plates, the combination of a back, a shaft having a handle thereon in a convenient position for the operator, a shaft connected with said shaft to be operated thereby, a stud connected with the end of the second shaft and having an arm thereon, an adjustable connection on said arm, and a matrix clip connected with and adapted to be operated by said adjustable connection, whereby with the turning of said handle the matrix clip will be opened and closed.

20. In a casting box for the purpose described, the combination with a movable mold having matrix bars and matrix clips, of a pair of stationary locking cams connected to operate the matrix bars, a third stationary locking cam on one side, a shaft on which one matrix bar is mounted, an arm projecting from the shaft and a roller on the arm for engaging the third locking cam, said locking cam being located in such position as to close the matrix bar on the pouring side of the machine when the casting box is in position for changing the matrix, whereby the matrix clip can be moved to release the matrix with the matrix bar in position, and the matrix bar may be opened and closed when the clip is locked up.

21. In a stereotype plate casting machine, the combination with a movable back and a rotatable cylinder, of a plate lifter movably mounted on the back and means for moving the plate lifter relatively to the back as the back closes on the cylinder, to follow the contour of the cylinder while lifting the edge of the cast plate therefrom.

22. In a stereotype plate casting machine, the combination with a movable back and a rotatable cylinder, of a plate lifter movably mounted on the back, and means for moving the plate lifter back from the cylinder and then forward toward the cylinder as the plate lifter carries the cast plate away from the cylinder.

23. In a stereotype plate casting machine, the combination with a cylinder and a reciprocable back, of a shaft, means connected with said shaft for moving the back toward and from the cylinder, means connected with said shaft for rotating the cylinder a half revolution after casting and leaving the plate on the cylinder with one edge materially below the center of the cylinder, a plate lifter pivotally mounted on and movable with the back and means, controlled by said shaft, for swinging the plate lifter into position with its plate engaging end under the edge of the cast plate as the back moves toward the cylinder and for then swinging the plate lifter back to allow it to pass around the convex side of the cylinder to a point above its center as the back closes, whereby the plate will be lifted from the cylinder on that side.

24. In a stereotype plate casting machine, the combination with a rotary cylinder, a reciprocable back, and a shaft having connections for operating the cylinder and back, of a cam on said shaft, a cam block depending from a stationary pivot and having a cam groove and provided with a roll for engaging said cam, a plate lifter on the back, a roll on the plate lifter adapted to engage in the groove in the cam block, the grooves in the cam and the cam block being so shaped as to swing the plate lifter nearly into contact with the cylinder at a point below its center, as the back starts to close, and for then swinging the plate lifter backwardly to follow the plate contour, as the back comes to casting position with respect to the cylinder.

25. In a stereotype printing plate casting machine, the combination with a cylinder and a movable back, of means for operating the back, a cam associated with said means to rotate once during each complete operation of the back, a cam block having a roll controlled by said cam and provided with a cam groove, and depending from a stationary pivot, a plate lifter, a roll on the plate lifter in the groove in the cam block, the plate lifter being so balanced that the action of gravity will swing its plate-engaging end outwardly, and a stop on the plate lifter for engaging the back, leaving the roll in position to enter the groove in the cam block.

26. In a stereotype printing plate casting machine, the combination with a cylinder and a movable back, of means for operating the back, a cam associated with said means to rotate once during each complete operation of the back, a cam block having a roll controlled by said cam, provided with a cam groove and depending from a stationary pivot, a plate lifter having a roll controlled by the groove in the cam block, the first named cam having a shape to locate the cam block in such position, when the back moves up toward the cylinder, that the plate-engaging end of the plate lifter will engage under the edge of the plate at a point below the center of the cylinder and the cam block groove having a shape to swing the plate-lifter back around the cylinder, substantially at the same distance from the cylinder all the time, as the back rises and closes and the plate lifter moves from a point below the center to a point above the center of the cylinder.

27. In a stereotype plate casting machine, the combination with a movable back and a rotatable cylinder, of a pair of ends on which the cylinder is mounted, said ends fitting the cylinder inside and having studs supported in bearings for carrying the cylinder.

28. A cylinder constituting one member of a mold for casting stereotype printing plates having end discs secured thereto inside and fitting the inside of the cylinder, said end discs having oppositely projecting studs constituting the supporting means for the cylinder.

29. In a stereotype plate casting machine, the combination with a movable back and a rotatable cylinder, of a pair of ends on which the cylinder is mounted, said ends fitting the cylinder inside and having studs supported in bearings for carrying the cylinder, a water pipe extending through one of said studs and perforated inside the cylinder and a siphon pipe extending to the bottom of the cylinder and axially through the other stud to deliver water therefrom.

30. In a stereotype plate casting machine, the combination with a back and rotary cylinder, of a pair of segmental end rings movable in between the back and cylinder to complete the mold, the end rings having cam surfaces thereon, means for supporting the end rings and preventing their motion in a rotary direction, and cam surfaces on the ends of said cylinder for forcing the end rings back when the cylinder rotates.

31. In a stereotype plate casting machine, the combination with a reciprocable back and a cylinder, of a pair of segmental end rings movable in between the back and cylinder to complete the mold and cast bevelled edges on the plate, means for rotating said cylinder to deliver the plate, the end rings having cam surfaces thereon, guides for supporting the end rings and preventing their motion in a rotary direction, springs for holding the end rings in position and cam surfaces on the ends of said cylinder for forcing the end rings back when the cylinder rotates, to permit of the delivery of the plate radially away from the cylinder.

32. In a stereotype plate casting machine, the combination with a cylinder and back constituting a casting box, each of them having a space for water, a valve for controlling the admission of water into the cylinder and back, means for introducing metal into the mold, and means whereby the metal introducing means will fill the mold and said valve will be opened to introduce water into the cylinder and back.

33. In a stereotype plate casting machine, the combination with a cylinder and back constituting a casting box, each of them having a space for water, a valve for controlling the admission of water into the cylinder and back, means for introducing metal into the mold, a pinion, means for oscillating the pinion, a clutch adapted to be connected to and disconnected from the pinion, and means whereby, when the clutch is engaged with the pinion, the metal introducing means will fill the mold and said valve will be opened to introduce water into the cylinder and back.

34. In a stereotype plate casting machine, the combination of a rotary cylinder and a reciprocable back, of means for reciprocating the back, means for rotating the cylinder a half revolution at a time, a gate associated with the cylinder for controlling the admission of metal to the mold, a water pipe communicating with the interior of the cylinder and the back, hand operated means for connecting the source of power with said gate for opening it and means whereby, when the hand-operated means is moved to open the gate, the valve in the water pipe will be opened thereby to introduce cooling water in the cylinder and back.

35. In a stereotype plate casting machine, the combination with a cylinder and back constituting the casting box, of a gate fitting the cylinder and movable circumferentially thereon to control the introduction of metal into the mold, said cylinder having ends provided with studs carried in bearings for supporting the cylinder, a pair of gate arms pivotally mounted on said studs, pins extending from the gate into the gate arms and means for oscillating said gate arms to swing the gate.

36. In a stereotype plate casting machine, the combination with a cylinder, means for rotating it intermittently, and a back for cooperating with the cylinder to complete the mold, of a gate movable circumferentially back and forth along the surface of the cylinder for controlling the admission of metal to the mold, a pin mounted on the gate, an arm arranged concentrically with the cylinder to oscillate about the center thereof, a crankshaft connected with said arm for oscillating it, said arm having a perforation for said gate pin, whereby the operation of the crankshaft will swing the gate.

37. In a stereotype plate casting machine, the combination with a cylinder, and a back cooperating with the cylinder to complete the mold, of a gate oscillatable circumferentially along the surface of the cylinder for controlling the admission of metal to the mold, an arm oscillatable about the center of the cylinder, a rod connected with the crank shaft to be reciprocated thereby, a stud through which the rod passes, said stud being connected with the end of the gate arm, and means for connecting the gate arm with the gate to move the latter.

38. In a stereotype plate casting machine, the combination with a cylinder, means for rotating it intermittently, and a back cooperating with the cylinder to complete the mold, of a gate oscillatable circumferentially along the surface of the cylinder for controlling the admission of metal to the mold, a pin mounted on the gate, an arm oscillatable about the center of the cylinder and having a slot for said gate pin, a crankshaft, a rod connected with the crankshaft to be reciprocated thereby, a stud through which the rod passes, said stud being connected with the end of the gate arm, and yielding means on said rod for transmitting its motion in both directions to the stud.

39. In a stereotype plate casting machine, the combination with a movable back and a rotatable cylinder, of a shaft, means connected with said shaft for reciprocating the back, means connected with said shaft for intermittently rotating the cylinder, a shaft connected with said shaft to be operated thereby and having a cam for controlling the operation of the back, a pair of cams on the last-named shaft, a lever having a cam roll for engaging the last two cams for moving it in opposite directions, a crankshaft, said lever having means for oscillating the crankshaft as controlled by the cams, a gate for controlling the admission of metal to the mold mounted concentric with the cylinder to move in an arc, and means operated by said crankshaft for swinging the gate.

40. In a stereotype plate casting machine, the combination with a movable back and a rotatable cylinder, of a shaft, a pair of cams on the shaft, a lever having a cam roll for engaging the two cams for moving it in opposite directions, a crankshaft, said lever having means for oscillating the crankshaft, a gate for controlling the admission of metal to the mold, and means operated by said crankshaft for swinging the gate.

41. In a stereotype plate casting machine, the combination with a rotatable cylinder and a reciprocable back, of a shaft, a gear on the shaft, a cam carried by said gear for operating the back toward and from the cylinder, a cam mounted on the back of said gear, a cam mounted on the first-named cam, a lever having a cam roll, the last two cams being adapted to engage the cam roll and one of them to move it in one direction and the other in the opposite direction, a crankshaft, means operated by the lever for oscillating the crankshaft, a gate adapted to move back and forth, and means operated by the crankshaft for oscillating the gate along the surface of the cylinder for admitting the metal to the mold and shutting it off.

42. In a stereotype plate casting machine, the combination with a rotatable cylinder and a reciprocable back, of a shaft, means connected with said shaft for rotating the cylinder intermittently, a gear on the shaft, an internal gear meshing with said gear, a shaft on which the internal gear is mounted, a cam carried by said internal gear for operating the back toward and from the cylinder, a cam mounted on the back of said gear, a cam mounted on the first-named cam, a lever having a cam roll, the last two cams being adapted to engage the cam roll and one of them to move it in one direction and the other in the opposite direction, a crankshaft, means operated by the lever for oscillating the crankshaft in accordance with the shape and position of the last two cams, a gate arranged concentric with the cylinder and adapted to move back and forth in a circumferential direction, and means operated by the crankshaft for oscillating the gate along the surface of the cylinder for admitting the metal to the mold and shutting it off.

43. In a stereotype plate casting machine, the combination with a mold, of a crankshaft, a gear loose thereon, means for oscillating said gear, a clutch for connecting the gear with the crankshaft having a flange provided with an opening therein, a spring pin located on a stationary part of the machine for engaging said hole and holding the clutch to prevent its being disengaged from the gear except when the gear is in registration with the opening, a gate operated by the crankshaft for admitting metal into the mold, said opening being located in such position as to insure the closure of the gate before the clutch can be disconnected from the pinion.

44. In a stereotype plate casting machine, the combination with a mold, of a crankshaft, a gear loose thereon, means for oscillating said gear, a clutch for connecting the gear with the crankshaft having a flange provided with an opening therein, a spring pin located on a stationary part of the machine for engaging said hole and holding the clutch to prevent its being disengaged from the gear except when the gear is in registration with the opening, a gate operated by the crankshaft for admitting metal into the mold, the position of the crankshaft being such that when the gate is closed its position cannot be changed so long as the locating pin is engaged in the opening in the clutch flange.

45. In a stereotype plate casting machine, the combination with a mold, of a hopper, means for introducing metal into the hopper, said hopper being mounted to reciprocate, a handle, means whereby on the turning of the handle the hopper will be moved into casting position, a gate located at the end of the hopper against which the hopper bears and yielding means for firmly holding the hopper against the mold.

46. In a stereotype plate casting machine, the combination with a mold, of a hopper, means for introducing metal into the hopper, said hopper being mounted to reciprocate, a handle, means whereby on the turning of the handle the hopper will be moved into casting position, a gate located at the end of the hopper against which the hopper bears and yielding means for firmly holding the gate against the hopper.

47. In a stereotype plate casting machine, the combination with a mold comprising a back and cylinder, of a gate mounted to swing on the surface of the cylinder, a hopper for delivering metal to the mold having an outlet adapted to be closed and opened by said gate, gate arms concentrically mounted with respect to said cylinder, means for swinging said gate arms in a circumferential direction, said gate arms having elongated slots therein, pins extending from opposite ends of the gate into said slots, whereby the oscillation of the arms will swing the gate, and means for moving said hopper back and forth with the gate, said slots being arranged to permit the gate to move back and forth with the pin projecting into said slots.

48. In a stereotype plate casting machine, the combination with a back and cylinder constituting the mold, of a hopper for receiving the metal and discharging it into the mold having an outlet adjacent to said cylinder, a movable gate bearing on the cylinder for opening and closing said outlet, a pair of gate arms pivoted on the axis of the cylinder and having means for moving the gate, a crankshaft having a crank thereon connected with said gate arms for moving them, a gear mounted freely on said crankshaft, means for oscillating the gear, and a clutch on the crankshaft for connecting the gear therewith to operate the crankshaft.

49. In a stereotype plate casting machine, the combination with a back and cylinder constituting the mold, of a hopper for receiving the metal and discharging it into the mold having an outlet adjacent to said cylinder, a movable gate on the cylinder for opening and closing said outlet, a pair of gate arms pivoted on the axis of the cylinder and having means for moving the gate, a crankshaft having a crank thereon connected with said gate arms for moving them, a gear mounted freely on said crankshaft, means for oscillating the gear, a clutch on the crankshaft for connecting the gear therewith to operate the crankshaft, a handle connected to throw the clutch in and out, a valve for controlling the admission of cooling water into the mold and means connected with the hand lever for opening and closing said valve.

50. In a stereotype plate casting machine, the combination with a back or cylinder forming a mold for casting a plate, a hopper for containing molten metal and introducing it into the mold, a gate for closing the end of the hopper and opening it to introduce metal into the mold, means for operating said gate periodically, means whereby the hopper can be moved by hand away from the gate and cylinder, a toe mounted on the gate, a crankshaft for operating the gate, a gear loose on the crankshaft for driving it, a shiftable clutch for connecting the crankshaft with the gear, said clutch having a flange in position for the toe on the gate to pass beyond it and prevent the clutch being engaged with the gear when the gate is out of position and adapted when in another position to bear on the flange and prevent motion of the hopper away from the cylinder.

51. In a stereotype plate casting machine, the combination with a frame, a cylinder rotatably mounted thereon, a back reciprocably mounted on the frame, a shaft on said frame, a second frame pivotally mounted on said shaft and adapted to swing thereon, a hopper carried by the second frame and movable therewith into a position to introduce metal into the mold and means for moving the hopper and the second frame.

52. In a stereotype plate casting machine, the combination with a frame, a cylinder rotatably mounted thereon, a back reciprocably mounted on the frame, a shaft on said frame, a second frame pivotally mounted on said shaft and adapted to swing thereon, a hopper carried by the second frame and movable therewith into a position to introduce metal into the mold, means for moving the hopper and the second frame, and a gate for controlling the admission of metal into the mold, of gate arms movable about the cylinder and having slots extending in the direction of motion of the second frame, and pins on the gate and entering the slots to permit the motion of the hopper and second frame.

53. In a stereotype plate casting machine, the combination with a frame, a cylinder rotatably mounted thereon, a back reciprocably mounted on the frame, a shaft on said frame, a second frame pivotally mounted on said shaft and adapted to swing thereon, a pump for molten metal mounted on the second frame, means for operating the pump, a hopper carried by the second frame and movable therewith into a position to introduce metal into the mold and means for moving the hopper and the second frame.

54. In a casting machine, the combination with a frame and a mold mounted thereon, of a second frame pivotally mounted at the bottom on the first frame, a hopper mounted on the second frame to move therewith toward and from the mold, hand operated means for swinging the second frame to bring the hopper into and out of casting position, a pump carried by the second frame for supplying the hopper with metal, said hopper having a chute at one side for receiving the metal from the pump and a float valve in the bottom adapted to open to allow the metal to drain out of the hopper into the pump and to close by the force of the metal when being pumped in and a wall having an opening at a higher level than the bottom of said chute for allowing the hopper to be filled therefrom.

55. In a casting machine, the combination with a frame and a mold mounted thereon, of a second frame pivotally mounted at the bottom on the first frame, a hopper mounted on the second frame to move therewith toward and from the mold, hand operated means for swinging the second frame to bring the hopper into and out of casting position, a pump carried by the second frame for supplying the hopper with metal, said hopper having a wall having an opening at a high level for allowing the hopper to be filled therefrom.

56. In a device for filling a mold with metal, the combination with a hopper and a pump, of a chute connected freely with the pump for receiving the metal therefrom, an opening from the chute into the hopper, a motor for running the pump, a switch in the motor circuit for controlling it, a float in the hopper and means connected with said float for opening the switch when the level of the metal in the hopper reaches a certain height to stop the pumping of the metal into the pump thereafter until the level of the metal is lowered.

57. In a stereotype plate casting machine, the combination with a cylinder and back constituting a casting box, each of them having a space for water, a valve for controlling the admission of water into the cylinder and back, means for introducing metal into the mold, a pinion, means for oscillating the pinion, a clutch adapted to be connected to and disconnected from the pinion, means whereby, when the clutch is engaged with the pinion, the metal introducing means will act to fill the mold and said valve will be opened to introduce water into the cylinder and back, a counting device for registering the number of castings and means whereby when the clutch is engaged with the pinion, the counting device will operate to add one to the count.

58. In a stereotype plate casting machine, the combination with a cylinder and back constituting a casting box, each of them having a space for water, a valve for controlling the admission of water into the cylinder and back, means for introducing metal into the mold, means whereby the metal introducing means will act to fill the mold and said valve will be opened to introduce water into the cylinder and back, a counting device for registering the number of castings and means whereby the counting device will operate to add one to the count.

In testimony whereof I have hereunto affixed my signature.

HENRY A. WISE WOOD.